United States Patent
Sadalgi et al.

(10) Patent No.: US 11,210,732 B1
(45) Date of Patent: Dec. 28, 2021

(54) SYSTEMS AND METHODS FOR VISUALIZING WALL COVERINGS IN AN IMAGE OF A SCENE

(71) Applicant: Wayfair LLC, Boston, MA (US)

(72) Inventors: Shrenik Sadalgi, Cambridge, MA (US); Christian Vázquez, Revere, MA (US)

(73) Assignee: Wayfair LLC, Boston, MA (US)

( * ) Notice: Subject to any disclaimer, the term of this patent is extended or adjusted under 35 U.S.C. 154(b) by 0 days.

(21) Appl. No.: 17/089,034

(22) Filed: Nov. 4, 2020

(51) Int. Cl.
| | |
|---|---|
| *G06Q 30/06* | (2012.01) |
| *G06K 9/62* | (2006.01) |
| *G06T 11/00* | (2006.01) |
| *G06N 3/08* | (2006.01) |
| *G06F 16/54* | (2019.01) |
| *H04M 1/72403* | (2021.01) |

(52) U.S. Cl.
CPC ......... *G06Q 30/0643* (2013.01); *G06F 16/54* (2019.01); *G06K 9/6202* (2013.01); *G06N 3/08* (2013.01); *G06T 11/00* (2013.01); *H04M 1/72403* (2021.01); *G06T 2200/24* (2013.01); *G06T 2210/04* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2010/0058268 A1* | 3/2010 | Fein | G06F 30/13 716/122 |
| 2013/0179841 A1* | 7/2013 | Mutton | G06F 3/04815 715/850 |
| 2017/0214880 A1* | 7/2017 | Ampollini | G06T 7/11 |
| 2020/0320792 A1 | 10/2020 | Sadalgi et al. | |
| 2020/0364324 A1* | 11/2020 | Ganeshmani | G06T 19/006 |

OTHER PUBLICATIONS

No Author Listed, ARLightEstimate. Apple Developer Documentation. 2020:2 pages. https://developer.apple.com/documentation/arkit/arlightestimate [Last accessed Jul. 30, 2021].
Liu et al., PlaneRCNN: 3D Plane Detection and Reconstruction from a Single Image. arXiv:1812.04072v2. Jan. 8, 2019:16 pages, https://arxiv.org/pdf/1812.04072.pdf [Last accessed Jul. 30, 2021].

(Continued)

*Primary Examiner* — Jennifer Mehmood
*Assistant Examiner* — Jed-Justin Imperial
(74) *Attorney, Agent, or Firm* — Wolf, Greenfield & Sacks, P.C.

(57) ABSTRACT

Methods and apparatus for visualizing a surface covering on at least a portion of a surface in an image of a scene. The method comprises identifying, using at least one computer processor, a surface plane from the image of the scene, determining, for each pixel of a plurality of pixels corresponding to the surface plane, whether the pixel corresponds to at least a portion of the surface in the scene, and generating an updated image of the scene by overlaying on the surface plane, a visualization of a plurality of surface covering tiles on pixels along the surface plane determined to correspond to at least a portion of the surface in the scene.

16 Claims, 22 Drawing Sheets

(56) References Cited

OTHER PUBLICATIONS

Tsang, Review: DeepLabv3+—Atrous Separable Convolution (Semantic Segmentation). Medium. Sep. 29, 2019:15 pages, https://sh-tsang.medium.com/review-deeplabv3-atrous-separable-convolution-semantic-segmentation-a625f6e83b90 [Last accessed Jul. 30, 2021].
Yu et al., Single-Image Piece-wise Planar 3D Reconstruction via Associative Embedding. arXiv:1902.09777v3. Apr. 24, 2019:14 pages, https://arxiv.org/pdf/1902.09777.pdf [Last accessed Jul. 30, 2021].

* cited by examiner

SYSTEMS AND METHODS FOR VISUALIZING WALL COVERINGS IN AN IMAGE OF A SCENE

BACKGROUND

Online retailers primarily sell products (e.g., furniture, toys, clothing, and electronics) through an online computer interface. Thereby, a customer can access the online computer interface to order products and have the products delivered to their home within a few days. Customers of online retailers, however, are increasingly demanding to see products in-person prior to purchase. Accordingly, some online retailers have established brick-and-mortar stores where customers can interact with products in-person prior to purchase.

SUMMARY

Some embodiments relate to a method of visualizing flooring on an image of a scene, the method comprises identifying, using at least one computer processor, a floor plane from the image of the scene, determining, for each pixel of a plurality of pixels corresponding to the floor plane, whether the pixel corresponds to floor in the scene, and generating an updated image of the scene by overlaying on the floor plane, a visualization of a plurality of flooring tiles on pixels along the floor plane determined to correspond to floor in the scene.

In at least one aspect, the method further comprises generating mask information by determining, for each pixel of a plurality of pixels in the image of the scene, whether the pixel corresponds to the floor in the scene, and determining, for each pixel of the plurality of pixels along the floor plane, whether the pixel corresponds to floor in the scene comprises identifying, using the mask information, portions of the floor plane that overlap with pixels in the image of the scene determined to correspond to the floor in the scene.

In at least one aspect, generating mask information comprises classifying each of the plurality of pixels in the image using a binary classifier.

In at least one aspect, generating mask information comprises providing the image of the scene as input to a trained neural network, and the mask information represents output of the trained neural network as a classification of each pixel of the plurality of pixels in the image of the scene as corresponding to floor or not-floor.

In at least one aspect, determining, for each pixel of the plurality of pixels in the image the scene, whether the pixel corresponds to the floor in the scene comprises classifying each of the pixels in the image as corresponding to floor or not floor.

In at least one aspect, the plurality of pixels along the floor plane comprises all of the pixels along the floor plane.

In at least one aspect, identifying a floor plane comprises extracting feature points from the scene in the image, and identifying the floor plane based on the extracted feature points.

In at least one aspect, the method further comprises capturing a plurality of images from a camera feed of a smartphone, wherein the plurality of images includes the image of a scene, and displaying a visualization of the identified floor plane on a display of the smartphone during capture of the plurality of images.

In at least one aspect, the method further comprises instructing a user of the smartphone to orient the camera of the smartphone in a particular direction to capture a desired view of the scene, and identifying the floor plane in response to the user orienting the smartphone in the particular direction such that the desired view of the scene is captured in the image.

In at least one aspect, the method further comprises generating, by an augmented reality application, the visualization as a virtual overlay of a floor plane on the image of the physical scene.

In at least one aspect, the method further comprises generating a flooring tile pattern from an image of a flooring tile, and wherein the visualization of the plurality of flooring tiles overlaid on the floor plane is based on the generated flooring tile pattern.

In at least one aspect, generating the flooring tile pattern comprises generating a bricked pattern, a stacked pattern or a staggered pattern.

In at least one aspect, overlaying the plurality of flooring tiles on the floor plane comprises repeating the generated flooring tile pattern to cover the entire floor plane for pixels on the floor plane determined to correspond to floor.

In at least one aspect, overlaying the plurality of flooring tiles on the floor plane comprises adjusting a transparency of the overlaid plurality of flooring tiles for pixels along the floor plane that do not correspond to floor such that the flooring tile pattern is not displayed on the pixels along the floor plane that do not correspond to floor.

In at least one aspect, generating a flooring tile pattern comprises including in the generated flooring tile pattern grout lines between the plurality of flooring tiles.

In at least one aspect, the method further comprises determining whether to perform tile synthesis based on an analysis of the image of the flooring tile, and generating, when it is determined to perform tile synthesis, at least one synthesized image of the flooring tile based on the image of the flooring tile, wherein the flooring tile pattern is generated based, at least in part, on the at least one synthesized image of the flooring tile.

In at least one aspect, determining whether to perform tile synthesis comprises determining a type of material shown in the image of the flooring tile and determining to perform tile synthesis based on the determined type of material.

In at least one aspect, determining whether to perform tile synthesis comprises determine to perform tile synthesis when the type of material is determined to be wood or vinyl.

In at least one aspect, determining whether to perform tile synthesis comprises determining not to perform tile synthesis when the image of the flooring tile is uniform or when the image of the flooring tile includes a repeating pattern.

In at least one aspect, determining whether to perform tile synthesis comprises determining to perform tile synthesis based on an amount of variation present in the image of the flooring tile.

In at least one aspect, generating at least one synthesized image of the flooring tile comprises generating a plurality of synthesized images of the flooring tile, and wherein the flooring tile pattern includes at least one of each of the plurality of synthesized images of the flooring tile.

In at least one aspect, generating the updated image comprises applying a shader to the floor plane to determine segments of the floor plane that include pixels corresponding to floor, and rendering the visualization of the plurality of flooring tiles only on the segments of the floor plane determined to be floor.

In at least one aspect, determining for each pixel along the floor plane, whether the pixel corresponds to floor in the scene comprises determining a probability that the pixel corresponds to floor in the scene, and generating the updated image comprises performing alpha blending of pixels of the visualization of a plurality of flooring tiles with pixels along the floor plane determined to correspond to floor in the scene, wherein the alpha blending is based, at least in part, on the corresponding probability for the pixel that the pixel corresponds to floor in the scene.

In at least one aspect, the method further comprises determining a luminance of each of the pixels in the image of the scene to generate a light map of the floor in the scene, and adjusting a value of pixels in the visualization of the plurality of flooring tiles based, at least in part, on the generated light map to generate a light-adjusted visualization, wherein generating the updated image comprises overlaying the light-adjusted visualization on the pixels along the floor plane determined to correspond to floor in the scene.

In at least one aspect, the method further comprises transforming a colorspace of the image of the scene to a YUV colorspace to generate a transformed image, and determining a luminance of each of the pixels in the image of the scene comprises determining a luminance of each of the pixel in the transformed image.

Some embodiments relate to a computing device configured to generate a visualization of flooring on an image of a scene. The computing device comprises at least one computer processor and at least one non-transitory computer-readable medium having a plurality of instructions stored thereon that, when executed by the at least one computer processor, perform a method. The method comprises receiving an image of a scene, identifying, from the image of the scene, a floor plane, determining, for each pixel of a plurality of pixels corresponding to the floor plane, whether the pixel corresponds to floor in the scene, and generating an updated image of the scene by overlaying on the floor plane, a visualization of a plurality of flooring tiles on pixels along the floor plane determined to correspond to floor in the scene.

In at least one aspect, the computing device further comprises an image capture device configured to capture the image of the scene, wherein receiving the image of the scene comprises receiving the image of the scene from the image capture device.

In at least one aspect, the computing device is a smartphone.

Some embodiments relate to a non-transitory computer readable medium having a plurality of computer-executable instructions stored thereon that, when executed by at least one computer processor perform a method of generating a visualization of flooring on an image of a scene. The method comprises identifying, from the image of the scene, a floor plane, determining, for each pixel of a plurality of pixels corresponding to the floor plane, whether the pixel corresponds to floor in the scene, and generating an updated image of the scene by overlaying on the floor plane, a visualization of a plurality of flooring tiles on pixels along the floor plane determined to correspond to floor in the scene.

Some embodiments relate to a method of visualizing a surface covering on at least a portion of a surface in an image of a scene. The method comprises identifying, using at least one computer processor, a surface plane from the image of the scene, determining, for each pixel of a plurality of pixels corresponding to the surface plane, whether the pixel corresponds to at least a portion of the surface in the scene, and generating an updated image of the scene by overlaying on the surface plane, a visualization of a plurality of surface covering tiles on pixels along the surface plane determined to correspond to at least a portion of the surface in the scene.

In at least one aspect, the surface is a wall in the image of the scene, and wherein the surface covering comprises wallpaper and/or wall tile.

In at least one aspect, the surface is a floor in the image of the scene, and wherein the surface covering comprises flooring tiles.

In at least one aspect, the surface is a floor in the image of the scene, and wherein the at least one portion of the surface in the scene is a portion of the floor on which a visualization of a floor covering is generated.

In at least one aspect, the method further comprises generating mask information by determining, for each pixel of a plurality of pixels in the image of the scene, whether the pixel corresponds to the at least a portion of the surface in the scene, and determining, for each pixel of the plurality of pixels along the surface plane, whether the pixel corresponds to the at least a portion of the surface in the scene comprises identifying, using the mask information, portions of the surface plane that overlap with pixels in the image of the scene determined to correspond to the at least a portion of the surface in the scene.

In at least one aspect, generating mask information comprises providing the image of the scene as input to a trained neural network, wherein the mask information represents output of the trained neural network as a classification of each pixel of the plurality of pixels in the image of the scene as corresponding to surface or not-surface.

Some embodiments relate to a method of visualizing a wall covering on an image of a scene. The method comprises receiving a selection of an image of a scene, determining a wall plane in the image, receiving a selection of one or more images of wall tiles to visualize in the image, and generating an updated image of the scene by overlaying on the determined wall plane, a visualization of the wall covering based, at least in part, on the selected one or more images of wall tiles.

In at least one aspect, the method further comprises providing, on a viewer displayed in a user interface, a scene selector including indicators for a plurality of images of scenes, and wherein receiving the selection of the image of the scene comprises receiving a selection of one of the plurality of images of scenes included in the scene selector.

In at least one aspect, the selected image of the scene is associated with a pre-selected wall plane, and wherein determining a wall plane in the image comprises determining the wall plane as the pre-selected wall plane.

In at least one aspect, the method further comprises generating, based on the selection of one or more images of wall tiles, a tile template, and generating an updated image of the scene comprises overlaying on the determined wall plane, the tile template.

In at least one aspect, generating a tile template comprises determining a shape category of the one or more tiles in the selected one or more images of wall tiles, and generating the tile template based, at least in part, on the determined shape category.

In at least one aspect, determining a shape category comprises determining whether the shape of the one or more tiles in the selected one or more images of wall tiles is a rectangle shape, a square shape or a hexagonal shape.

In at least one aspect, the method further comprises determining, based on the determined shape category, an overlap between tiles in the tile template, and generating the tile template based, at least in part, on the determined overlap.

In at least one aspect, determining a shape category comprises determining that the shape of the one or more tiles is a non-standard shape, calculating, for each of the one or more tiles, a maximum number of background pixels in a row and column direction of the tile template to determine an offset, and determining, based at least in part, on the offset, the overlap between tiles in the tile template.

In at least one aspect, generating the tile template based, at least in part, on the determine overlap comprises using an alpha blending technique to generate the tile template.

In at least one aspect, the method further comprises storing the generated tile template on one or more non-transitory storage devices.

In at least one aspect, determining a wall plane comprises extracting feature points from the scene in the image, and identifying the floor plane based on the extracted feature points.

In at least one aspect, the method further comprises capturing a plurality of images from a camera feed of a smartphone, wherein the plurality of images includes the image of a scene, and displaying a visualization of the determined wall plane on a display of the smartphone during capture of the plurality of images.

In at least one aspect, the method further comprises generating, by an augmented reality application, the visualization as a virtual overlay of a wall plane on an image of a physical scene.

In at least one aspect, generating the updated image comprises applying a shader to the wall plane to determine segments of the wall plane that include pixels corresponding to wall, and rendering the visualization of the wall covering only on the segments of the wall plane determined to be wall.

In at least one aspect, generating the updated image comprises generating the updated image to include lighting information.

In at least one aspect, generating the updated image to include lighting information comprises determining a luminance of each of the pixels in the image of the scene to generate a light map of the wall plane in the scene, and adjusting a value of pixels in the visualization of the wall covering based, at least in part, on the generated light map to generate a light-adjusted visualization of the wall covering, wherein generating the updated image comprises overlaying the light-adjusted visualization on the pixels along the wall plane determined to correspond to wall in the scene.

Some embodiments relate to a computing device configured to generate a visualization of a wall covering on an image of a scene. The computing device comprises at least one computer processor, and at least one non-transitory computer-readable medium having a plurality of instructions stored thereon that, when executed by the at least one computer processor, perform a method. The method comprises receiving an image of a scene, determine a wall plane in the image, receiving a selection of one or more images of wall tiles to visualize in the image, and generating an updated image of the scene by overlaying on the determined wall plane, a visualization of the wall covering based, at least in part, on the selected one or more images of wall tiles.

In at least one aspect, the computing device further comprises an image capture device configured to capture the image of the scene, wherein receiving the image of the scene comprises receiving the image of the scene from the image capture device.

In at least one aspect, the computing device is smartphone.

Some embodiments relate to a non-transitory computer readable medium having a plurality of computer-executable instructions stored thereon that, when executed by at least one computer processor perform a method of generating a visualization of a wall covering on an image of a scene. The method comprises receiving an image of a scene, determine a wall plane in the image, receiving a selection of one or more images of wall tiles to visualize in the image, and generating an updated image of the scene by overlaying on the determined wall plane, a visualization of the wall covering based, at least in part, on the selected one or more images of wall tiles.

It should be appreciated that all combinations of the foregoing concepts and additional concepts discussed in greater detail below (provided such concepts are not mutually inconsistent) are contemplated as being part of the inventive subject matter disclosed herein.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

As mentioned above, some online retailers have established brick-and-mortar stores to make products available for customers to see in-person prior to purchase. One such product that is often helpful for customers to view in-person prior to purchase is flooring. Brick-and-mortar stores that sell flooring often stock physical sample tiles of flooring that can be viewed in the store or loaned to a customer so they can physically place the sample tile in a desired location of their home or office prior to purchase. The inventors have appreciated that customers seeking to purchase flooring or other surface coverings (e.g., rugs, wallpaper, wall tile, etc.) from online retailers would benefit from being able to visualize the surface coverings in their homes or offices prior to purchase from the online retailer. To this end, some embodiments relate to systems and methods for visualizing flooring or other surface coverings within an image of a scene captured, for example, by a camera of a smartphone.

Figure 1:
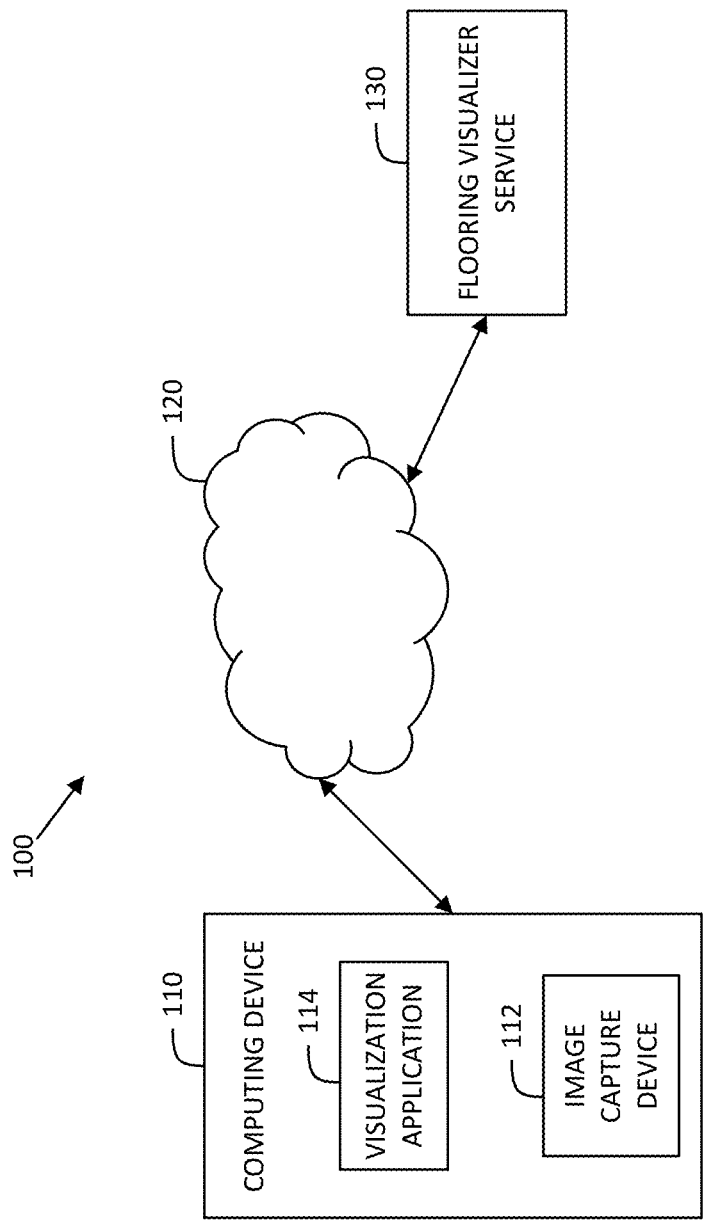
FIG. 1 is a schematic illustration of components of a system for visualizing flooring in an image of a scene in accordance with some embodiments.

FIG. 1 schematically illustrates components of a system 100 for visualizing flooring in a scene in accordance with some embodiments. System 100 includes computing device 110. Non-limiting examples of computing device 110 include a smartphone, a tablet computer, a smartwatch, and a laptop computer. In some embodiments, computing device 110 may be configured to provide an augmented reality (AR) or extended reality (XR) environment within which a user of the computing device 110 may visualize flooring or other surface coverings within an image of a scene displayed on the computing device 110. As shown, computing device 110 includes image capture device 112, such as one or more cameras, and a visualization application 114 configured to process one or more images captured by the image capture device 112. Image capture device 112 may be integrated with computing device 110 as shown (e.g., as one or more built-in cameras) or alternatively, image capture device 112 may be provided separately from computing device 110 and images captured by the image capture device 112 may be transferred to computing device 110, for instance, via wired and/or wireless (e.g., Bluetooth) communication, for processing by visualization application 114 using one or more of the techniques described herein. In some embodiments, one or more images processed in accordance with the techniques described herein may include one or more "smart photos" that include both an image of a scene and associated metadata indicating, for example, how to recreate an augmented reality interface using the image. Examples of smart photos are described in U.S. patent application Ser. No. 16/691,952 entitled "Systems and Methods for Scene-Independent Augmented Reality Interfaces," the entire contents of which are incorporated by reference herein.

System 100 also includes flooring visualizer service 130 coupled to computing device 110 via network 120. As described in more detail below, flooring visualizer service 130 may be configured to process one or more images captured by image capture device 112 to generate a mask information. The mask information may associate each of a plurality of pixels in the image(s) as belonging to a particular surface (e.g., a floor) over which tiles of a surface covering (e.g., flooring) may be overlaid. Although shown as a service provided separate from computing device 110 over a network, it should be appreciated that in some embodiments, some or all of the functionality of flooring visualizer service 130 may be provided locally on computing device 110 such that connection to a network may not be necessary. Similarly, although shown as being performed locally on computing device 110, some or all of the functionality provided by visualization application 114 may be provided remotely from computing device 110, for example, on one or more computing devices (not shown) coupled to computing device 110 via network 120. Network 120 may be implemented using any suitable wired or wireless communication media.

Figure 2:
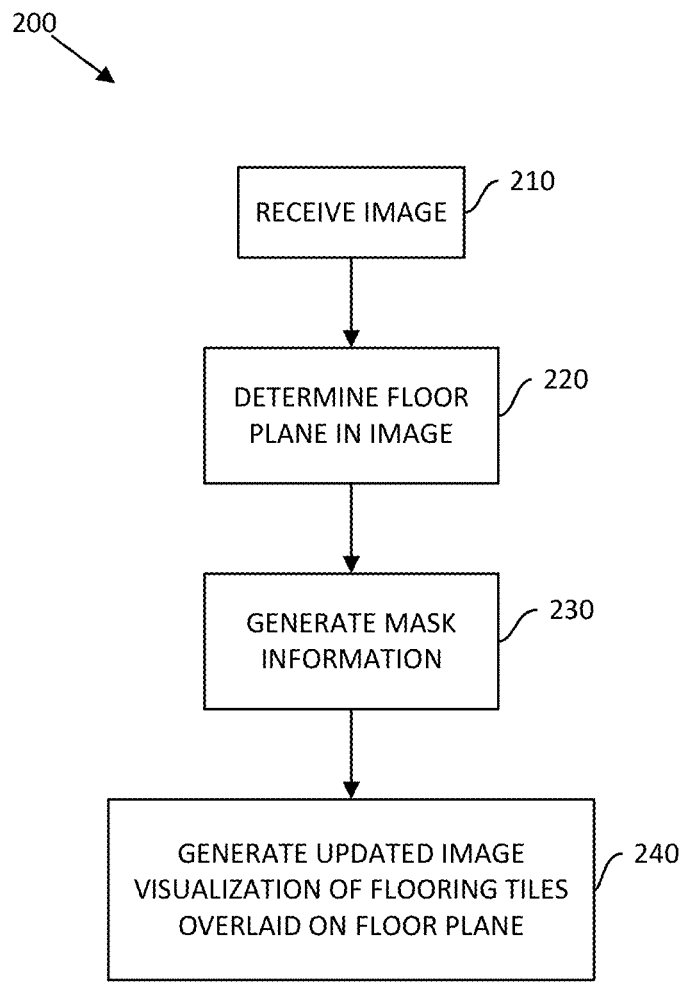
FIG. 2 is a flowchart of a process for generating an updated image of a scene that includes a flooring visualization in accordance with some embodiments.

FIG. 2 illustrates a process 200 for visualizing flooring in a scene in accordance with some embodiments. In act 210, an image of a scene is received (e.g., from image capture device 112). Process 200 then proceeds to act 220, where a floor plane in the received image is determined. The floor plane in the image may be determined in any suitable way. For instance, in some embodiments image capture device 112 may be configured to capture a time series of images (e.g., a camera feed or video) of a user's environment. As the image capture device is moved around by a user, visualization application 114 (or some other application executing on computing device 110) may process the images to identify one or more floor planes in the user's environment as the images are being captured. For instance, an identified floor plane in the captured images may be shown in an overlay, which may help guide the user to orient the image capture device 112 to orient the image capture device in a manner that captures an image of the scene at a suitable angle to perform further processing on the image, as discussed in more detail below. After the image capture device 112 is oriented at a suitable angle, an image, which may be used for further processing, is selected. The captured image may be automatically selected by the image capture device 112 and/or visualization application 114 or may be selected in response to a user interacting with the computing device 110 (e.g., by interacting with a user interface of the computing device to capture an image of the scene).

Process 200 then proceeds to act 230, where mask information for the captured image is determined. The captured image may be processed to determine, for at least some pixels in the image, whether the pixel corresponds to floor or not-floor, and the output of the process may be mask information. In some embodiments, only certain pixels in the image (e.g., pixels corresponding to the identified floor plane) are classified as floor/not-floor. In other embodiments, most or all pixels in the image are classified as being floor/not-floor to produce the mask information. Generation of the mask information in act 230 is also referred to herein as "segmentation" in which the captured image is segmented into regions of pixels that correspond to floor and regions of pixels that do not correspond to floor. In some embodiments, the mask information represents binary values (i.e., floor or not floor) for each of a plurality of pixels in the image. Additionally, in some embodiments, each of the pixels represented in the mask information may be associated with both a classification (e.g., floor/not floor) and a probability that the classification is correct. Further details of the process for generating mask information in accordance with some embodiments is described below.

Process 200 then proceeds to act 240, where an updated image of the captured scene is generated by overlaying flooring tiles on the previously identified floor plane using the mask information generated in act 230. For instance, the updated image may be similar to the image captured by the user, but with some or all pixels on the identified floor plane replaced with a flooring pattern corresponding to a floor tile selected by a user of computing device 110. Although act 230 of generating mask information is shown as following act 220 of determining the floor plane(s) in the image, it should be appreciated that acts 220 and 230 may be performed in any order and may be performed in series or in parallel.

Figure 3:
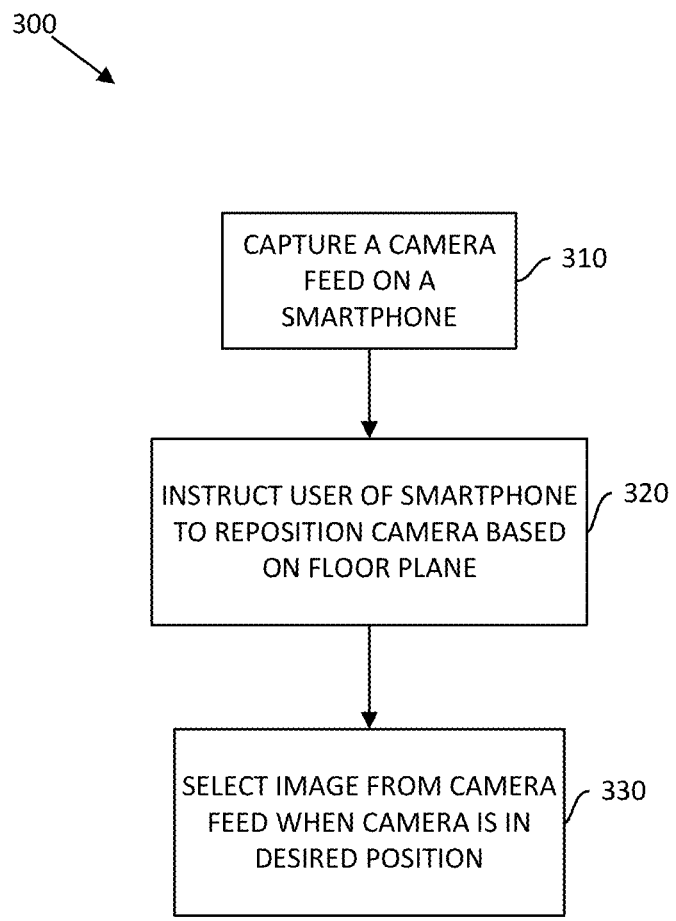
FIG. 3 is a flowchart of a process for capturing an image of a scene at a desired orientation in accordance with some embodiments.

FIG. 3 is a flowchart of a process 300 for capturing an image of a scene using a smartphone in accordance with some embodiments. In act 310, a camera feed (a video) may be captured using a camera of the smartphone. For instance, initiation of capturing the camera feed may occur in response to a user of the smartphone starting or otherwise engaging with visualization application 114 executing on the smartphone. It should be appreciated that in some embodiments the camera feed captured in act 310 may not be stored by the smartphone and may be presented to the user in a preview mode to enable selection of an image in a desired orientation. For instance, in some embodiments, the smartphone may provide an augmented reality (AR) or extended reality (XR) environment within which a user may capture an image of a scene and visualize flooring in the captured image of the scene.

Process 300 then proceeds to act 320, where the user of the smartphone may be instructed to reposition the camera of the smartphone to enable detection of a floor plane in the scene of the user's environment detected by the visualization application 114. The instructions provided to the user may be explicit or implicit based on information presented on the display of the smartphone. For instance, by moving the smartphone and its camera around, the visualization application 114 may identify one or more candidate floor planes in the images of the camera feed. After detection of one or more candidate floor planes, an indication of the detected floor plane(s) may be displayed to the user by, for example, presenting a visualization of the floor plane(s) overlaid on the camera feed presented on the display of the smartphone. The candidate floor plane(s) may be identified in any suitable way. For instance, in some embodiments, one or more feature points in the scene are extracted and the extracted feature points are used to create the candidate floor planes. Process 300 then proceeds to act 330, where an image of the scene is selected from the camera feed when the camera is oriented in a desired direction. The image of the scene may be captured automatically (e.g., when the visualization application identifies only a single candidate floor plane) or image of the scene may be captured in response to user interaction with the smartphone. For instance, a user may select one of the identified candidate floor planes and in response, an image of the scene including the floor plane may be captured.

Figure 4:
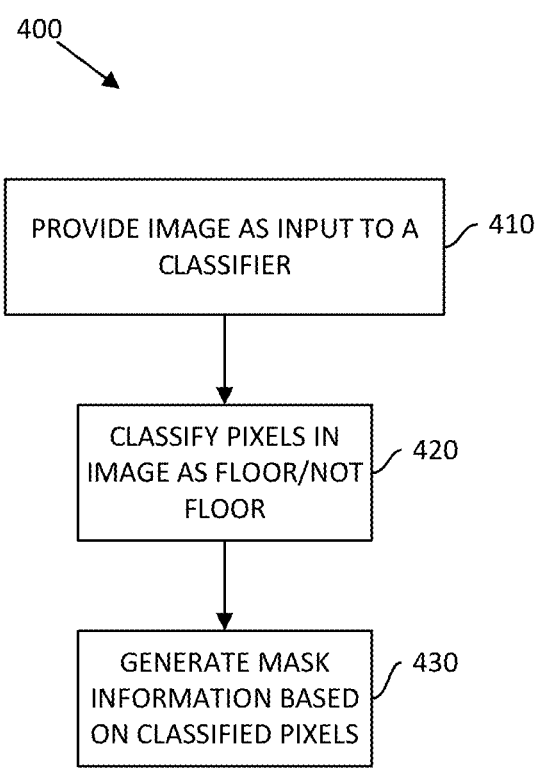
FIG. 4 is a flowchart of a process for generating mask information corresponding to classification of pixels in an image of a scene in accordance with some embodiments.

The inventors have recognized that not all pixels corresponding to the identified floor plane in the captured image may correspond to floor in the image. Accordingly, some embodiments use flooring visualizer service 130 to classify at least some of the pixels in the captured image of the scene as either corresponding to floor or not floor. The pixel classification process is also referred to herein as "generating mask information" or "segmentation". FIG. 4 is a flowchart of a process 400 for generating mask information in accordance with some embodiments. In act 410, an image (e.g., the image captured in act 330 of process 300) and/or one or more features extracted from the image is provided as input to a classifier. Process 400 then proceeds to act 420, where at least some of the pixels in the image are classified as floor/not-floor using the classifier. Process 400 then proceeds to act 430, where mask information is generated based on the output of the classifier. In some embodiments the classifier is configured to implement a machine learning approach by using one or more trained statistical networks (e.g., one or more trained neural networks) to assign individual pixels in an image to a particular class (e.g., floor/not-floor) mask information. The mask information may include a classification for each pixel in the captured image. Alternatively, the mask information may include a classification only for a subset of pixels in the captured image corresponding, for example, to some or all of the pixels along the identified floor plane in the image. In embodiments in which the mask information is generated by one or more computing resources (e.g., flooring visualizer service 130) remotely located from the computing device associated with the captured image, the generated mask information may be returned to the computing device for further processing as described in more detail below.

Figure 5:
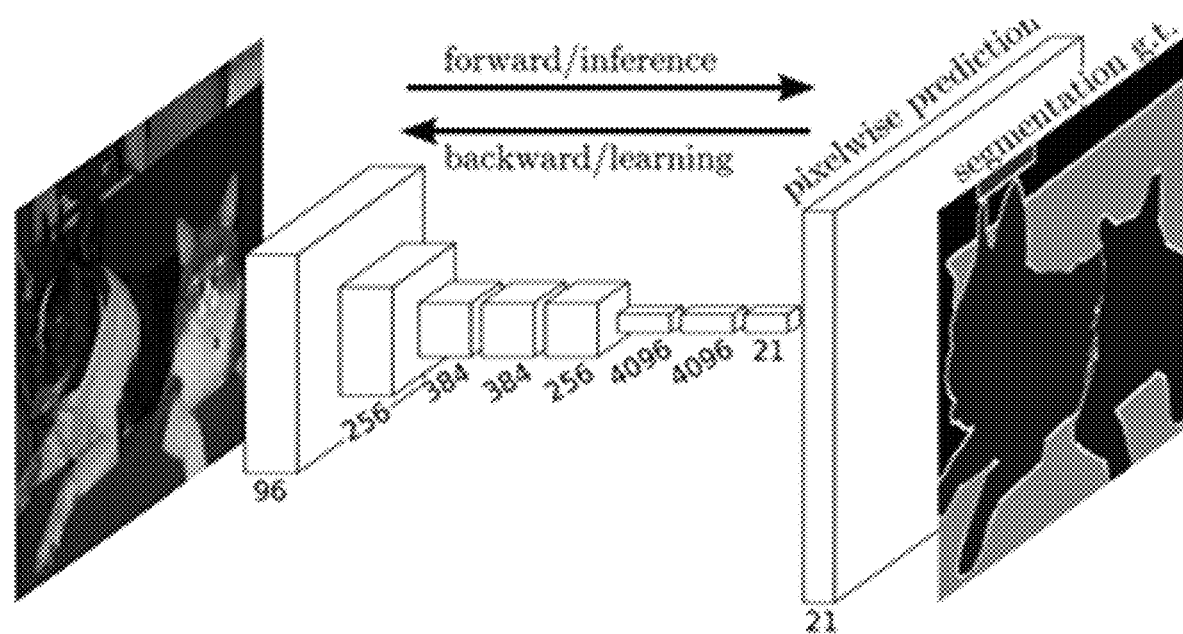
FIG. 5 is a schematic illustration of a classification model that may be used to generate mask information in accordance with some embodiments.

FIG. 5 illustrates an example of a classifier implemented as a multi-layer neural network, which may be used to perform image segmentation to generate mask information in accordance with some embodiments. FIG. 5 illustrates a fully connected convolutional network (FCN), which receives an image as input, performs convolutions to extract features in the image and deconvolves the features to assign a class to individual pixels in the image. A neural network architecture for performing real-time semantic segmentation of images (e.g., the ICNet network architecture) may be used to perform segmentation of the image of a scene. In some embodiments, a neural network model used for segmentation may be trained using data to enable the model to recognize multiple classes of objects in a scene (e.g., floor, chair, wall, sofa, etc.). In other embodiments, the neural network model may be trained to perform binary classification (e.g., floor/not-floor). The neural network architecture may be configured to perform real-time segmentation. Alternatively, the neural network architecture may be configured to prioritize accuracy over real-time segmentation by performing non-real-time segmentation. In some embodiments, the neural network used for segmentation has a DeepLab-v3+ with a resnet-101 backbone architecture. The network may be trained for ~30 epochs on a set of 12,000 images to produce mask information of a floor.

As discussed above in connection with act 240 of process 200, an updated image may be generated by adding a visualization of flooring tiles overlaid on the identified floor plane. Online retailers often provide a large number of styles of flooring tile for purchase. To visualize flooring within a user's space based on a particular selected flooring tile, the tile must be replicated and patterned along the flooring plane in the image. Accordingly, some embodiments relate to generating a group or "swatch" of tiles at the correct scale, such that the swatch on a virtual plane (e.g., a floor plane) can be rendered in a way that it reflects the actual size of the flooring tile in the user's space. Assuming there is a set of tiles from which a group of tiles can be created, information about the pixel size of a tile, the target pixel size of the flooring overlay, the physical size of a tile, and the target physical size of the swatch in space may be determined. For instance, the pixel size of the tile may be obtained directly from the image, and the physical size of the tile may be determined from product manufacturing information. In some embodiments, the physical size of a tile and pixel size of the flooring overlay can be arbitrarily chosen, as long as the aspect ratio is maintained.

Some embodiments generate a group or collage of tiles based on the pixel and physical size parameters above. From the target size of the collage and the physical size of an individual tile, a number of tiles that should be displayed in a single instance of the flooring visualization may be determined. Additionally, since the flooring visualization size in pixels may be arbitrary, and the pixel size of the tile is known, a relationship between pixels and physical size of the output swatch can be determined. After generating a desired pattern, some embodiments use a shader (e.g., a metal shader or other material shader) to repeat the generated pattern to ensure that the displayed flooring will have accurate dimensions provided that the flooring plane is placed an appropriate depth in the image.

Figure 6C:
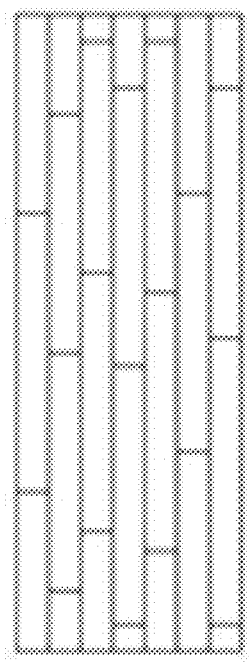
FIG. 6C is an illustration of a staggered pattern of tiles that may be used in accordance with some embodiments.
Figure 6B:
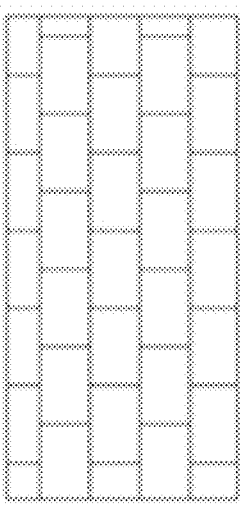
FIG. 6B is an illustration of a bricked pattern of tiles that may be used in accordance with some embodiments.
Figure 6A:
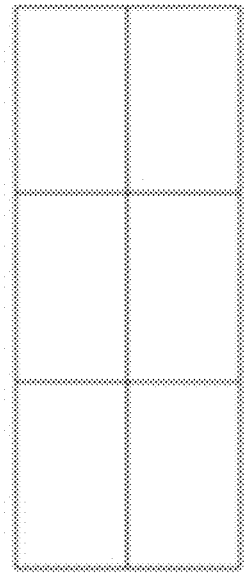
FIG. 6A is an illustration of a stacked pattern of tiles that may be used in accordance with some embodiments.

The same set of tiles can be arranged in a number of different patterns. Non-limiting examples of patterns include bricked, stacked, and staggered, examples of which are shown in FIGS. 6A-C. FIG. 6A illustrates a collage of tiles in a stacked pattern. FIG. 6B illustrates a collage of tiles in a bricked pattern. FIG. 6C illustrates a collage of tiles in a staggered pattern. In some embodiments, tiles are arranged in a pattern without any distance between the tiles as shown in FIGS. 6A-C. In other embodiments, the pattern may include space between the tiles with grout of a specified color visualized in the spaces between the tiles.

The inventors have recognized that when the same tiles are used to create a group or collage of tiles, the characteristics (e.g., variation, movement) of the individual tiles when grouped may result in unnatural patterns emerging from the repetition of artifacts in each individual tile. For instance, wood flooring tiles typically have more natural variation across the tile than ceramic tiles for bathroom flooring. The inventors have recognized that when individual tiles are replicated to form larger groups of tiles, the individual characteristics and variations in the tiles should be taken into account to provide a more realistic appearance when the flooring is visualized in the image of the user's environment or scene.

Some embodiments relate to synthesizing new tiles from a limited set of tiles. Within tile variation can be observed in wood patterns, or granite tiles. This type of variation is typically a result of the medium from which the tile was created. Furthermore, this variation is considered unstructured. That is, patterns within a tile are not considered variation. Across tile variation identifies variation across tiles in a particular arrangement of tiles. This type of variation manifests typically as a radical change in patterns or colors across tiles considered to be part of the same product.

Figure 7:
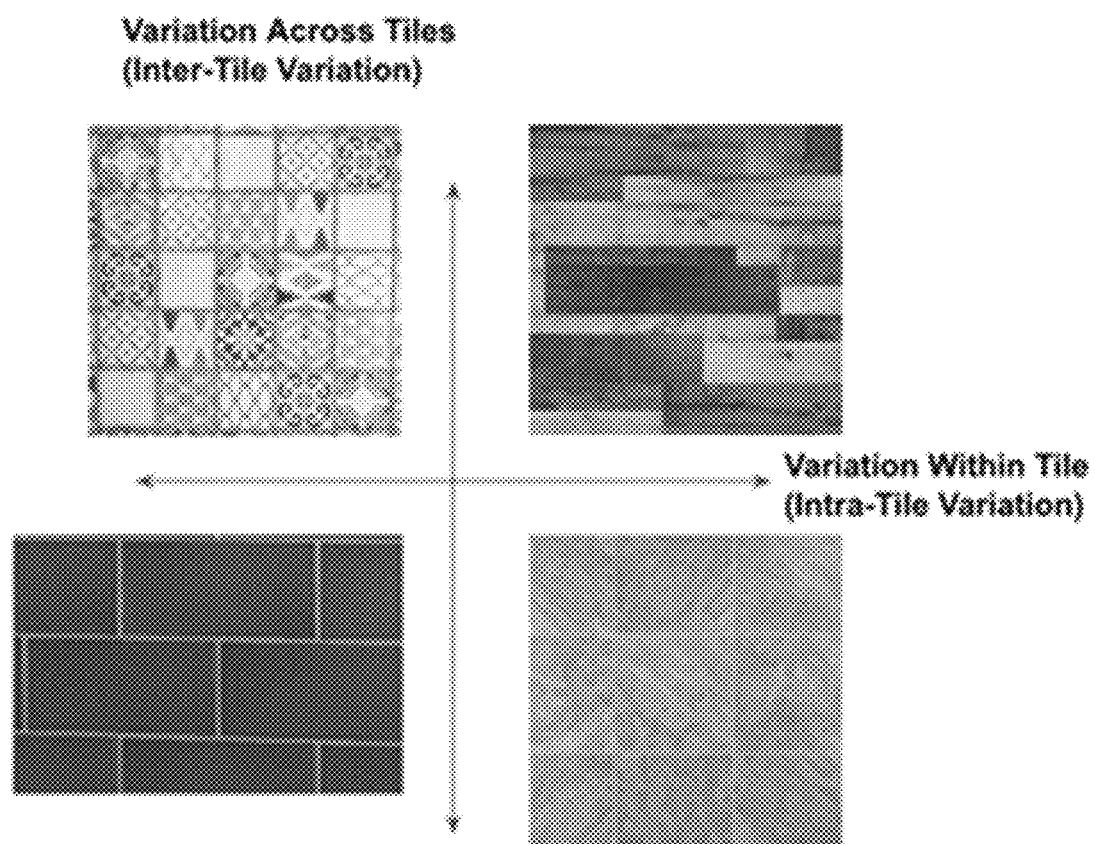
FIG. 7 illustrates examples of intra-tile variation for different types of tiles that may be visualized in an image of a scene in accordance with some embodiments.

The inventors have appreciated that floor tiles may be characterized as one of multiple variation types that are relevant to image synthesis, examples of which as shown in FIG. 7. For instance, tiles shown in the bottom left quadrant represent tiles with little to no variation, such as those with solid color. Such tiles may benefit from synthesis that captures natural color variations in the example tile image, but the benefit may be limited and not justified given the computational cost of synthesis. Synthesis applied to tiles with structured patterns may generate poor quality images due to distortion of the structured pattern introduced by the synthesis process. For tiles in the upper left quadrant, a single tile may not suffice to generate a tiling pattern that captures the overall variation of the group of tiles, and accordingly, tiles with this type of variation may not be suitable for synthesis. Rather, tiles having characteristics in the left upper and lower quadrants of FIG. 7 may be repeated in a group without performing synthesis, provided that a representative set of tiles is available to create the group.

Tiles in the bottom right quadrant of FIG. 7 have a natural variance that would benefit from synthesis to provide a larger variety of tiles having similar characteristics. Because the essence of a tile is captured in a single tile, only a single tile is required for synthesis to generate a representative set. For tiles having characteristics shown in the upper right quadrant of FIG. 7, synthesis can be used to generate tiles that capture the essence of a tile. However, synthesis may fail to generate tiles representative of the overall look and feel if a representative set of tiles provided to the synthesis process. That is, a tile sample set that represents variation across tiles belonging to the same product may be provided to the synthesis process such that the resulting synthesized tiles are representative of the variation in the product.

In some embodiments, synthesis is performed by generating multiresolution samples. For instance, an image of a tile may be analyzed, and pixel region rules may be generated based on the analysis. A number of pixels may be initialized randomly in the synthesized tiles and through iterations the synthesis process "remixes" the information in the original example(s) and ensures the seams between patches blend properly. Unlike a machine learning approach to synthesis, some embodiments are able to generate convincing imagery in a matter of minutes for high resolution tiles, and seconds for moderately sized tiles.

Figure 8:
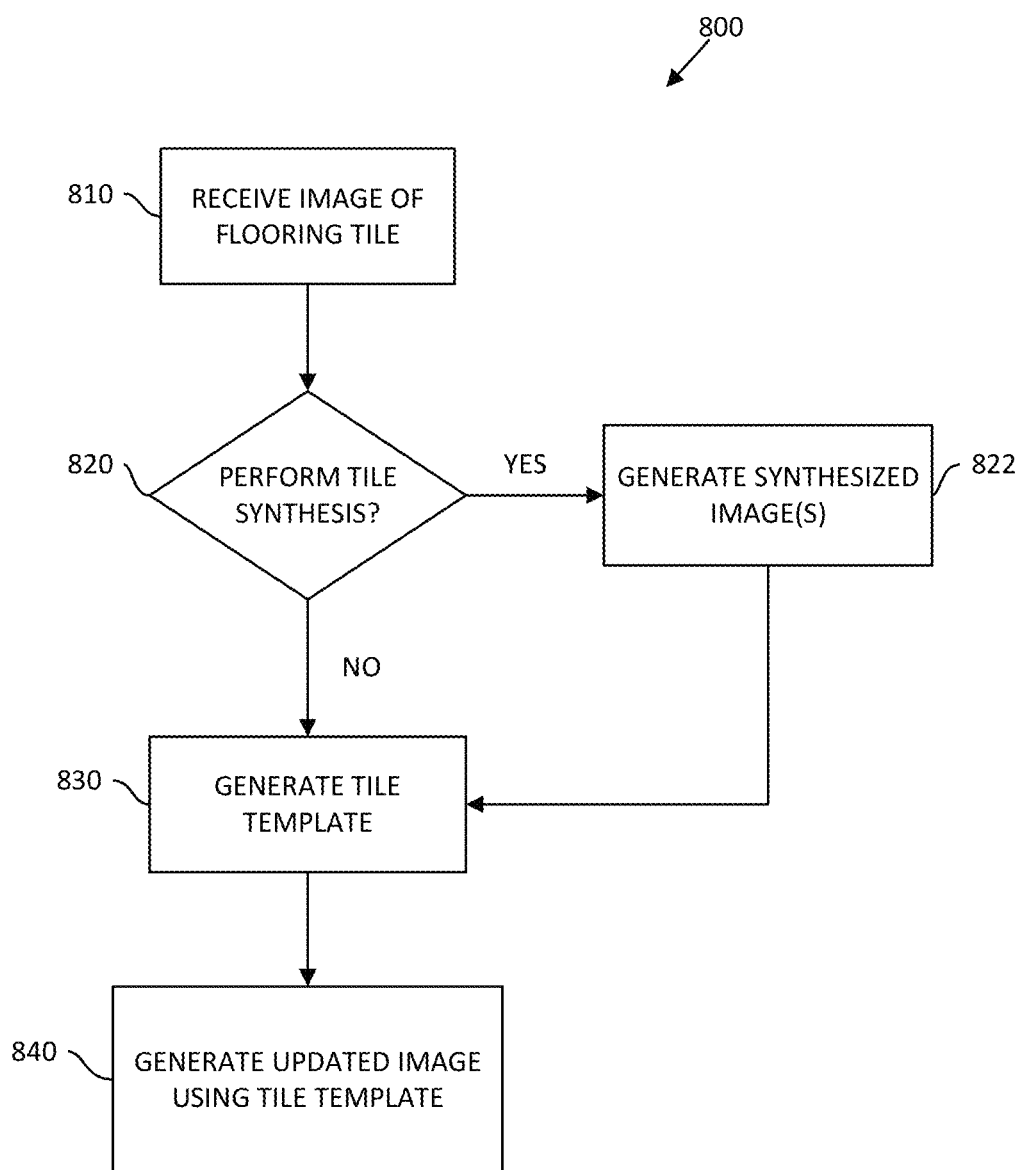
FIG. 8 illustrates a flowchart of a process for generating a group of tiles as a tile template in accordance with some embodiments.

As discussed above, when creating groups of tiles, the inventors have appreciated that tile synthesis is not always needed or desired. FIG. 8 illustrates a process 800 for generating a group or template of tiles that may be used for a flooring visualization in accordance with some embodiments. In act 810, an image of a flooring tile may be received. For instance, an online retailer may make available for purchase a large number of different styles of tile, each of which is associated with a different stock keeping unit (sku), and a user may select an image of a particular tile displayed in a user interface of an online retailer's web application and/or visualization application. Process 800 then proceeds to act 820, where it is determined whether to perform tile synthesis on the selected tile. As discussed above with regard to the different tile characteristics shown in FIG. 7, not all tiles may be subjected to synthesis. Accordingly, the image of the selected tile may be analyzed to determine whether to perform tile synthesis. Factors that may favor performing tile synthesis include, but are not limited to, the type of material (e.g., whether the type of material is vinyl or wood) shown in the image of the tile, the uniformity or amount of variation in the tile, and the variation across multiple tiles within a same product (e.g., a single sku).

If it is determined in act 820 to perform tile synthesis, process 800 proceeds to act 822, where one or more synthesized images are generated based on the received tile. In some embodiments, a stochastic image synthesis approach is used to synthesize one or more images of a tile. Following tile synthesis, process 800 proceeds to act 830, where a group or "swatch" of tiles, which may be used as a template for the flooring visualization, is generated using the synthesized tile(s) generated in act 822. Alternatively, if it is determined in act 820 to not perform tile synthesis, process 800 proceeds to act 830, where a group of tiles is generated based on the received image of the flooring tile. Regardless of whether the tile template is generated based, at least in part, on images of synthesized tiles or is generated based only using the received image of the tile, the multiple tiles in the tile template may be arranged in a pattern (e.g., stacked, bricked, staggered), with or without grout lines separating the tiles, as selected by the user. Following generation of the tile template, process 800 proceeds to act 840, where the generated tile template is used to generate an updated image that includes the flooring visualization on the image of the scene captured by the user. For instance, a visualization application executing on a user's smartphone may apply the generated tile template over the floor plane identified in a captured image, as described above.

Although the tile synthesis process is described as being performed during process 800 of generating an updated image that includes the flooring visualization on the image of a scene, in some embodiments, tile synthesis may be performed prior to capturing an image by a user and the groups or swatches of tiles may be stored by one or more storage devices located on the computing device and/or located remote from the computing device over one or more networks. By performing tile synthesis in advance, the process of creating the visualization may take less time than when the groups of tiles are synthesized during the process of creating the flooring visualization.

Figure 9:
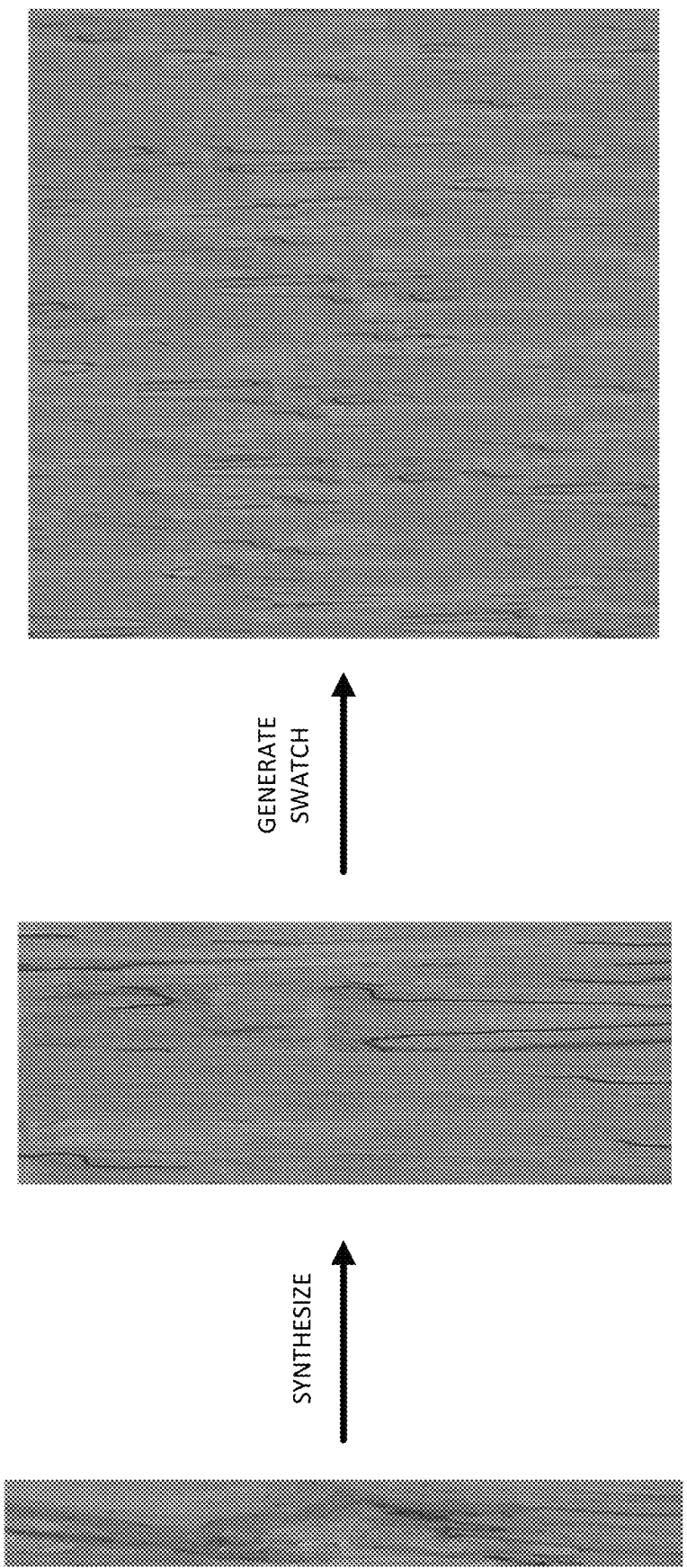
FIG. 9 schematically illustrates a process for synthesizing one or more tiles based on an image of a selected tile and creating a tile template based, at least in part, on the synthesized tile(s) in accordance with some embodiments.

FIG. 9 schematically illustrates a process for generating a group or "swatch" of tiles from a single tile using synthesized tiles in accordance with some embodiments. As shown, an image of a tile may be selected for synthesis. Synthesis may be performed on the selected image of the tile to generate one or more synthesized tiles that include similar features. For instance, in the wood tile shown in FIG. 9, four images of wood tiles having a same size but different grain variation are synthesized to create a set of synthesized tiles. Although an example of using a single tile for tile synthesis is shown and described it should be appreciated that tile synthesis may performed on any number of images of example tiles for a single product. For instance, a wood tile product may include multiple example images of tiles for the product and one or more of the multiple example images may be used for tile synthesis. The synthesized tiles in the set are then repeated to generate a group or "swatch" of tiles that is representative of (but not identical to) the originally selected tile as shown in FIG. 9. The swatch may then be applied along the floor plane to provide a visualization of flooring along the plane as described above, and in more detail below.

Figure 10:
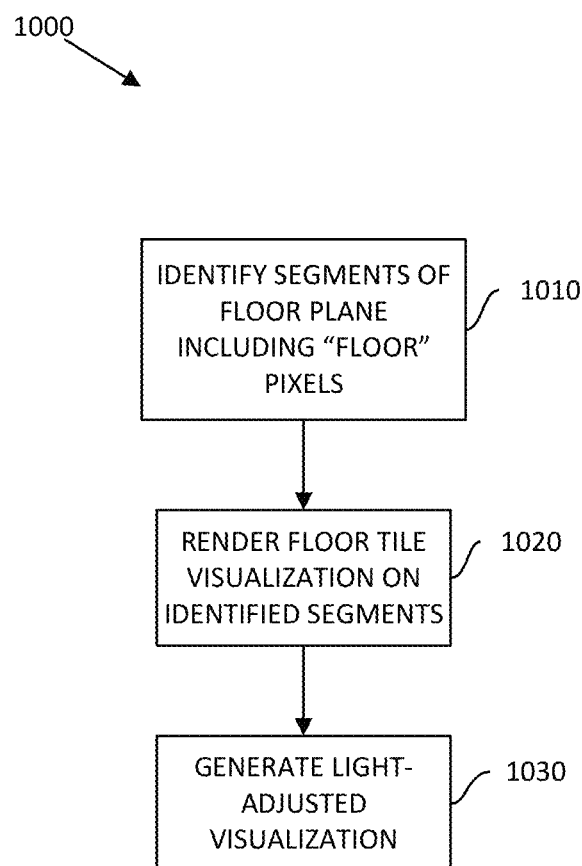
FIG. 10 illustrates a flowchart of a process for rendering a flooring visualization on an image of a scene based, at least in part, on mask information in accordance with some embodiments.

Once the generated tile template has been applied over the floor plane and the mask information has been generated, some embodiments employ techniques to determine which pixels along the floor plane to render in the final updated image of the scene as tile and which pixels to render in the visualization as pixels from the original captured image (e.g., by making the tile template overlay transparent for those pixels). FIG. 10 illustrates a process 1000 for determining how to render pixels corresponding to the floor plane based on the tile template and the mask information in accordance with some embodiments. In act 1010, one or more segments of the floor plane that include pixels classified as floor based on the mask information are identified. For instance, a shader may be applied to the floor plane. The shader may be configured to determine the position in the image of each of a plurality of segments along the floor plane and whether the segment overlaps with a pixel classified as flooring in the mask information.

Process 1000 then proceeds to act 1020, where the floor tile visualization corresponding to the identified segments classified as floor. For instance, if a segment is identified as overlapping with a pixel classified as floor in the mask information, the flooring visualization for the segment is rendered. Otherwise, if the segment is identified as non-overlapping with a pixel classified as floor in the mask information, the flooring visualization for the segment is not rendered (e.g., the flooring visualization overlay is set to transparent for the segment).

In some embodiments, the mask information output from segmentation of the captured image is used as a binary mask, giving full transparency to non-overlapping pixels, and fully rendering overlapping pixels. The inventors have recognized that under some circumstances, this approach may make misclassified pixels stand out in the updated image, for example when sections of non-floor are improperly rendered as floor. To minimize the effect of errors in segmentation on the overall quality of the render, some embodiments perform alpha blending based on the output of the segmentation process (i.e., the mask information). For instance, as discussed above, in some embodiments, segmentation is performed using a machine learning model such as a neural network having a plurality of layers. The output of the network may include both a binary classification (e.g., floor/not-floor) for each of a plurality of pixels in the image and a probability that the classification is correct. For instance, when the final layer of the neural network is a softmax layer, the resultant output values can be treated as a probability that reflects the confidence that the classification is correct. As a result, pixels with high confidence may be rendered as floor, whereas pixels where the network has low confidence may be blended with the underlying image using alpha blending, rather than being made completely transparent. Such an approach may create an illusion that the overall floor is correctly classified despite some misclassification artifacts in the segmentation.

The inventors have recognized that some images resulting from the use of alpha blending may have an "artificial" feel to them, which may be due, in part, by the loss of lighting information that is originally in the scene. By overlaying generated flooring tiles over the original floor in the image all shadows, highlights, and effects from lights are removed from the image, which tends to make the image less natural looking. Returning back to process 1000, after the floor tile visualization has been rendered on the identified segments of the floor plane that overlap with "floor" pixels in the mask information, process 1000 proceeds to act 1030, where the flooring visualization is optionally adjusted to take into account light, shadows, and other effects in the original image of the scene to provide a more realistic updated image when the flooring visualization is added.

In some embodiments, a light-adjusted visualization of the flooring tiles is created by extracting a "luminance" component from at least some pixels in the captured image. The luminance component can then be used to approximate the effect of lighting variations over the floor. In some embodiments, the luminance of a pixel can be determined by converting a captured RGB image to a YUV colorspace. Unlike the RGB colorspace, the YUV colorspace attempts to create a more lighting-independent representation of colors, such that luminance of pixels can be extracted as an independent channel from hue. The extracted luminance values can then be used to create a "light map" of the floor from an image, which can subsequently be used to alter the value of the pixels in the mask information to create a "darker" or "lighter" pixel value at a particular pixel in the mask, thus emulating the effect of transferring shadows onto the blended image. For instance, the blending based on the light map may be performed in the shader, described above. Accordingly, although shown as separate acts in process 1000, it should be appreciated that acts 1020 and 1030 may be combined into a single act implemented by the shader to provide a more natural blended floor tile visualization.

The inventors have recognized that when certain types of flooring tiles are used (e.g., noisy, patterned floors), using luminance values for pixels directly in tile blending may cause the underlying patterns of the floor to emerge in the mask information. To mitigate this issue, some embodiments blur the original image to remove patterns prior to extracting luminance values from the image. The effect of blurring the image diffuses the shadows to some extent, but the result may be qualitatively better than an image with no blended lights.

Figure 11A:
FIGS. 11A-11C schematically illustrate a process for visualizing flooring in a 3D image of a scene in accordance with some embodiments.
Figure 11B:
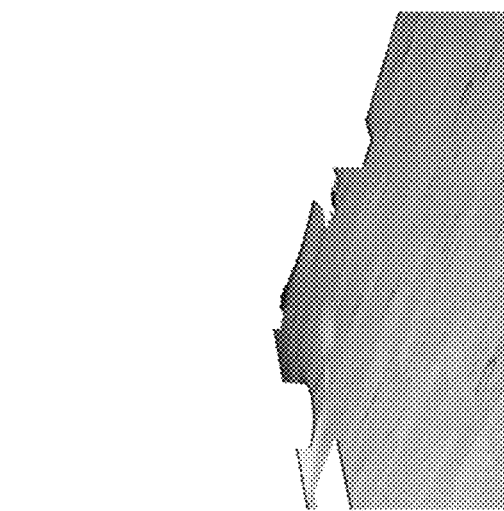
Figure 11C:
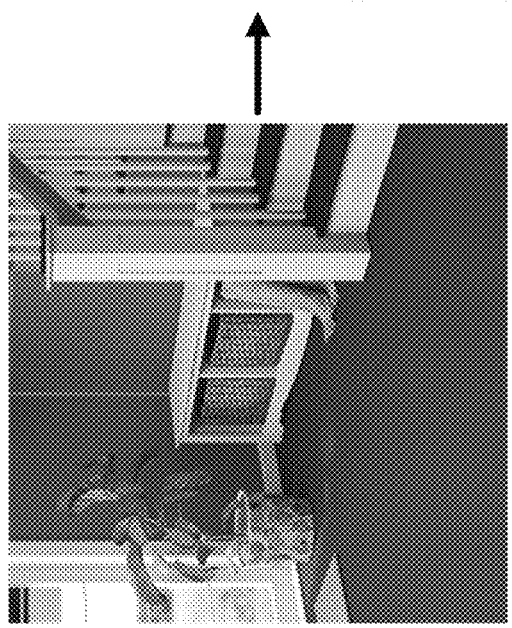

In some embodiments, instead of applying a flooring visualization on a two-dimensional (2D) image captured by a user, a flooring visualization may be provided on a three-dimensional (3D) representation of a scene as shown in FIGS. 11A-C. FIG. 11A illustrates a 3D scene with no flooring added. Depending on the flooring to be added to the scene, one or more tiles may be synthesized and formed into a group of tiles, as described above. The floor plane in the 3D scene may be determined and the group of tiles may be repeated along the determined floor plane as an overlay as shown in FIG. 11B. The overlay shown in FIG. 11B can then be rendered into the 3D scene as shown in FIG. 11C.

Figure 12A:
FIGS. 12A and 12B illustrate screenshots of a user interface of a smartphone configured to capture an image of a scene in accordance with some embodiments.
Figure 12B:
Figure 13:
FIG. 13 illustrates a screenshot of a user interface of a smartphone in which a flooring visualization has been added to an image of a scene captured by a camera of the smartphone.

FIGS. 12 and 13 illustrate screenshots of an example of a user using a smartphone to add a flooring visualization to an image of a scene captured by the camera of the smartphone in accordance with some embodiments. As shown in FIG. 12A, a user may orient the camera of their smartphone to capture a camera feed of images of an environment in which the user wants to add new flooring. As the user moves the camera around, images in the captured camera feed may be analyzed to determine one or more floor planes in the image. When the camera is oriented in a direction that enables a floor plane to be identified an image of a scene of the user's environment may be captured as shown in FIG. 12B.

After an image is captured, the user is prompted to select from among different flooring choices e.g., provided by on online retailer to view as a flooring visualization in the scene. Upon selection of a flooring to visualize in the scene, the selected flooring is overlaid along the detected flooring plane to enable the user to visualize the flooring in the scene of their environment using one or more of the techniques described herein as shown in FIG. 13. A user interface displayed on the smartphone may be configured to enable the user to toggle through different flooring selections and/or patterns (e.g., bricked, stacked, staggered) such that the user is able to evaluate how different flooring would look in their space.

Figure 14A:
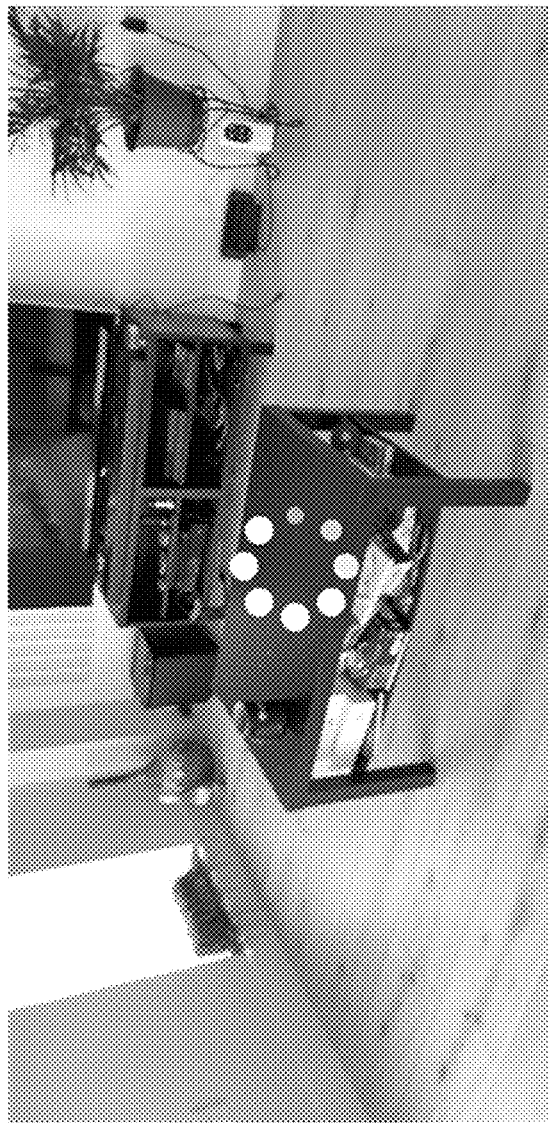
FIG. 14A illustrates a screenshot of a user interface of a smartphone configured to capture an image of a scene in accordance with some embodiments.
Figure 14B:
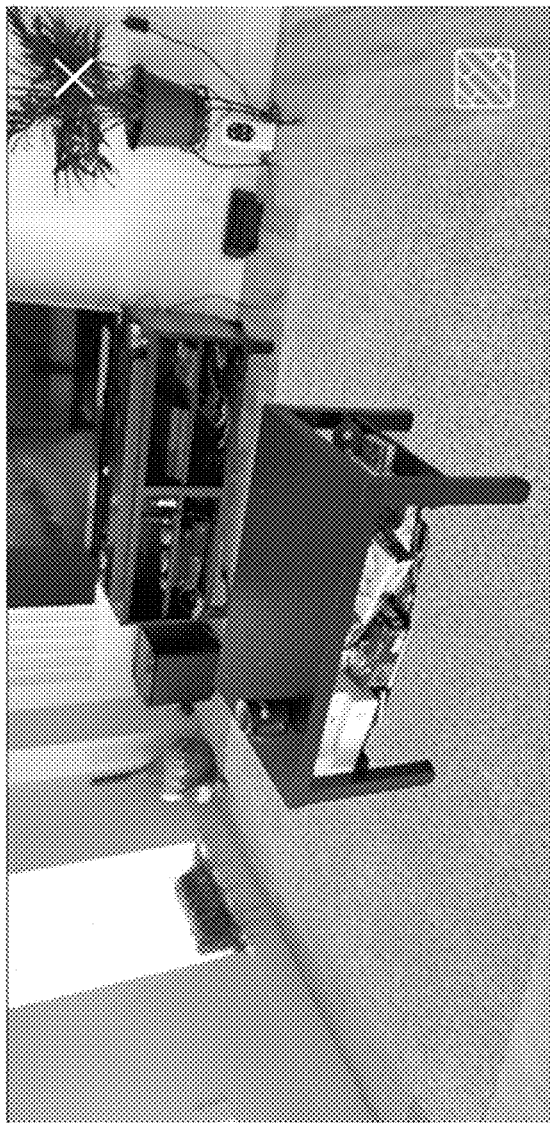
FIG. 14B illustrates a screenshot of a user interface of a smartphone in which a floor covering has been added to the image of the scene shown in FIG. 14A in accordance with some embodiments.

The techniques described above relate to detecting floor planes in an image and providing a flooring overlay along the floor plane using mask information. The inventors have recognized that similar techniques may be used to visualize other floor coverings (e.g., rugs) in 2D or 3D images of scenes. FIGS. 14A and 14B show screenshots of a user interface on a smartphone in which a flooring visualization application executing on the smartphone is used to visualize a rug in an image of a scene captured by the smartphone. FIG. 14A shows an image of a scene being captured by a smartphone. One or more floor planes may be identified in the captured image, and mask information may be generated to classify pixels in the image as being floor or not floor using one or more of the techniques described herein. One or more visualization flooring overlays may then be created based on a comparison of segments of the floor plane(s) and the mask information. FIG. 14B shows an updated image that includes two flooring overlays added to the captured scene shown in FIG. 14B. A first overlay provides a visualization of new flooring that covers the entire flooring plane (e.g. for pixels classified as floor) identified in the image of the scene, as described above. A second overlay provides a visualization of a rug covering a portion of the first overlay such that the user may visualize a rug placed under a table in the scene. In some embodiments, the user may be able to interact with the user interface to resize and/or drag the rug floor covering visualization to a different location along the floor plane within the image of the scene.

The inventors have also recognized that one or more of the techniques described herein may be used to generate visualization overlays on one or more planes in an image other than a floor plane. For instance, some embodiments are configured to identify one or more wall planes in an image of a room and mask information may be generated to classify pixels in the image as wall or not wall. The identified wall plane(s) and mask information can then be used to generate a visualization wall overlay that may be used to produce an updated image of the scene in which tile, wallpaper, or another suitable wall surface covering is displayed overlaying all or a portion of the identified wall plane(s).

Figure 15:
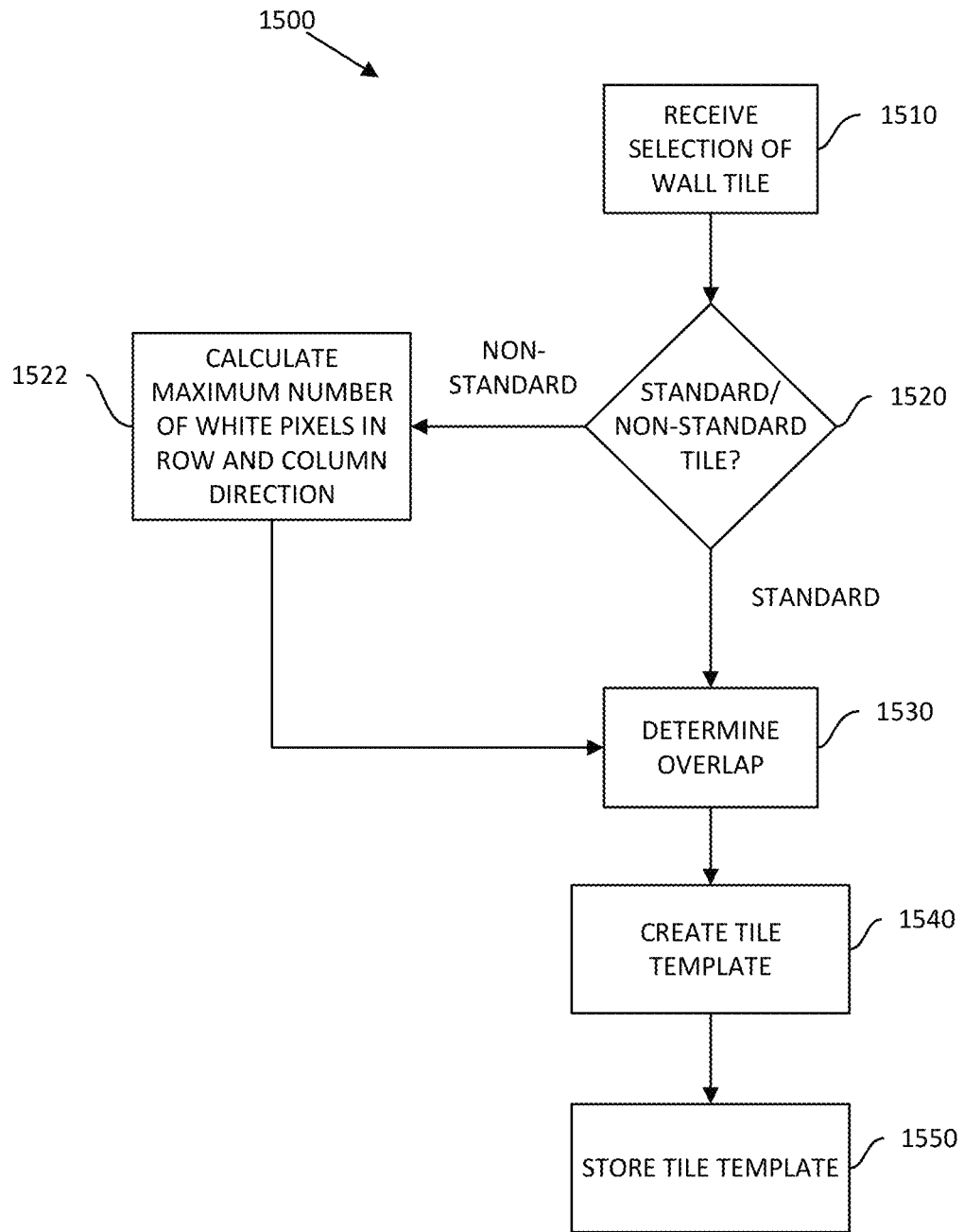
FIG. 15 illustrates a process for creating a tile template for a wall surface covering in accordance with some embodiments.
Figure 16A:
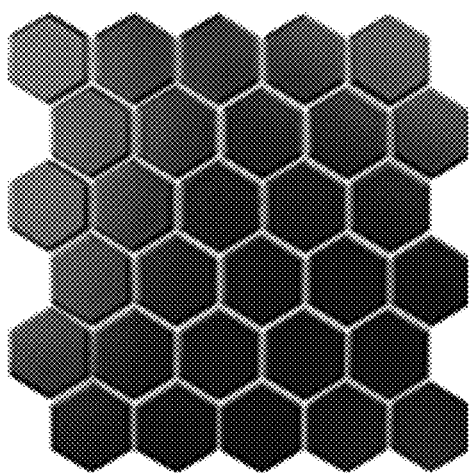
FIGS. 16A-16D illustrate examples of individual tiles and tile sheets that may be used to create a tile template in accordance with some embodiments.
Figure 16B:
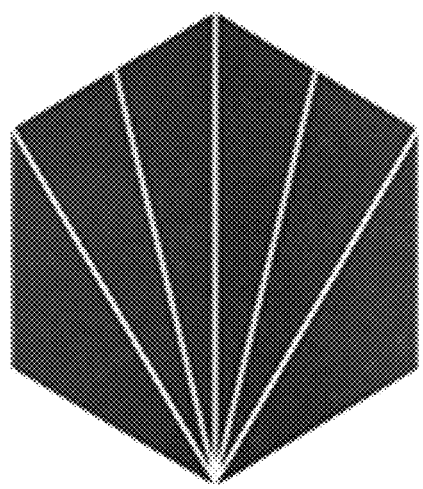
Figure 16C:
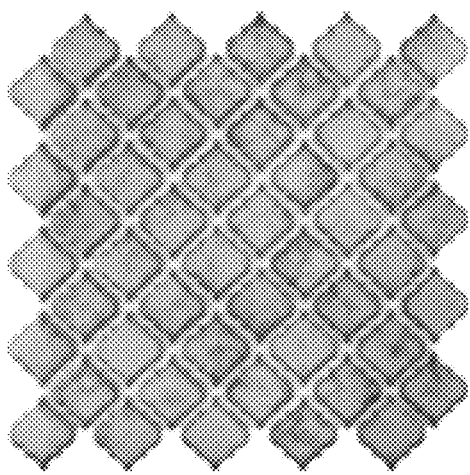
Figure 16D:
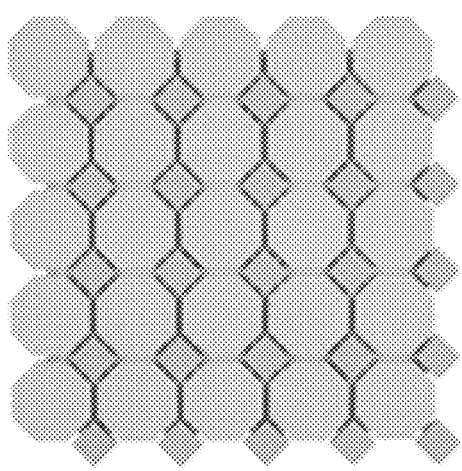

FIG. 15 illustrates a flow chart of a process 1500 for generating a tile template (also referred to herein as a tile "swatch") from an image of a single wall tile or tile sheet in accordance with some embodiments. In act 1510, selection of an image of a wall tile or tile sheet is received. For example, a user may interact with a user interface to select an image of a wall tile or tile sheet from which the tile template will be generated. Process 1500 then proceeds to act 1520, where it is determined whether the tile has one of a plurality of standard shapes or whether the tile shape is not-standard. The inventors have recognized that mosaic and field tiles often come in a variety of shapes and patterns of arrangement. Most commonly, tiles are hexagonal, square, rectangular, or diamond in shape and are arranged in a grid-like pattern. To capture some of the variations in shapes, in some embodiments, tiles are classified into one or more categories based on the shapes of the individual tiles. For instance, tiles may be classified into regular, standard, and non-standard categories. Non-limiting examples of regular shaped tiles include tiles having a square or rectangle shape. Non-limiting examples of standard shaped tiles include tiles having a hexagonal shape, examples of which are shown in FIGS. 16A (standard tile sheet) and 16B (standard single tile). Non-limiting examples of non-standard shaped tiles include tiles having curved shapes, diamond shapes or combination of smaller tiles. Examples of non-standard tile sheets are shown in FIGS. 16C and 16D.

To ensure that each tile appears as the right size in the updated image of the scene, the tile may be scaled. In some embodiments, the target size of the tile template is specified in meters, the physical size of the tiles is specified (e.g., in meters) and the resolutions of the tile template and tile image in pixels is used to create an algorithm where the relationship between the dimensions of the tile template and the tile image is determined. This relationship (e.g., ratio) may then be used to scale the tile image. In some embodiments, the target height of the tile template and its resolution may be specified by a user. The width of the tile template may be determined by the aspect ratio of the tile image so that the tiles are not stretched or squeezed in the tile template. Given the size of the scaled tile image and the size of the tile template, the number of tile sheets/tiles that will fit on the tile template may be determined.

In the tile template, since the tile should fit together with no space between them, except for grouting) and given that mosaic tiles have a variety of shapes, in some embodiments the tile images are placed in the tile template with some amount of overlap. In some embodiments, the overlap between tiles is achieved using alpha blending, which is a process of overlaying a foreground image over a background image where transparency of the foreground image determines which part of the foreground or background image is observed in the combined image. For instance, for regularly-shaped tiles (e.g., square- and rectangle-shaped tiles) an alpha mask may be created where pixels belonging to the background have 100% transparency and pixels belonging to the tile are completely opaque (i.e., 0% transparency). Accordingly, when overlaying a tile image on another tile image, the background of the top image will be completely transparent displaying the tile pixels of the bottom image.

Returning to process 1500, if it is determined in act 1520 that the tile/tile sheet is a standard tile/tile sheet (e.g., hexagonal-shaped tiles), the process proceeds to act 1530, where an amount of overlap between the tile images in the tile template is determined. For instance, data from equations describing hexagons (or another standard shape) may be used to determine the number of tiles per row and column in the tile template. Taking into consideration the grouting information, the amount of overlap between the tile images as they are tiled in the tile template may be determined and the amount of overlap may be randomized so that any variations appear natural.

Figure 17A:
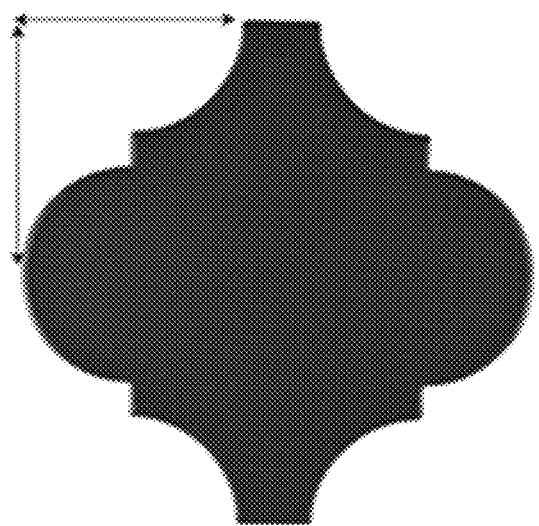
FIGS. 17A and 17B schematically illustrate a technique in accordance with some embodiments for determining a number of row and column pixels for non-standard shaped tiles and tile sheets, respectively.
Figure 17B:
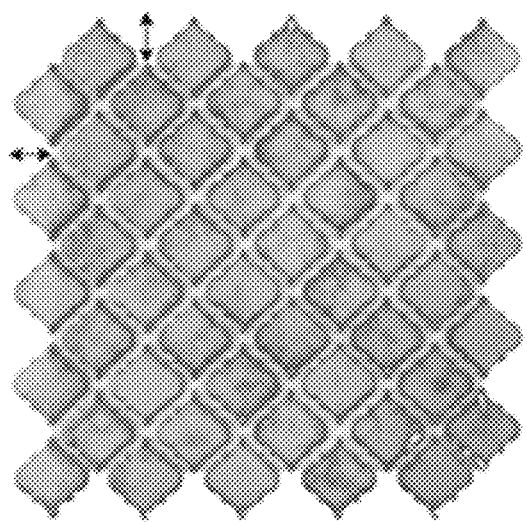

If it is determined in act 1520 that the tile shape is non-standard (e.g., curved or diamond shaped, process 1500 proceeds to act 1522, where a maximum number of white pixels in the row and column directions of the tile template is calculated for the non-standard tile shape. FIG. 17A illustrates an example of an individual non-standard shaped tile in which the maximum number of white pixels along the row and column directions (e.g., as shown by the arrows in FIG. 17A) is determined. FIG. 17B illustrates an example of a non-standard shaped tile sheet in which the maximum number of white pixels along the row and column directions (e.g., as shown by the arrows in FIG. 17A) is determined. By determining the maximum number of white pixels along the row and column directions, an offset of the tile images in the tile template can be determined. Process 1500 then proceeds to act 1530, where an amount of overlap between the tile images in the tile template is determined based on the determined offset. In the case of tile sheets, the row and column direction pixel distances may be used instead of determining the number of tiles across a row and column of a tile template because the tile shape can be highly varied and it may be difficult to determine the overlap correctly. Accordingly, in such instances, the overlap between tile sheet images may be the amount by which the background is not seen.

Figure 18:
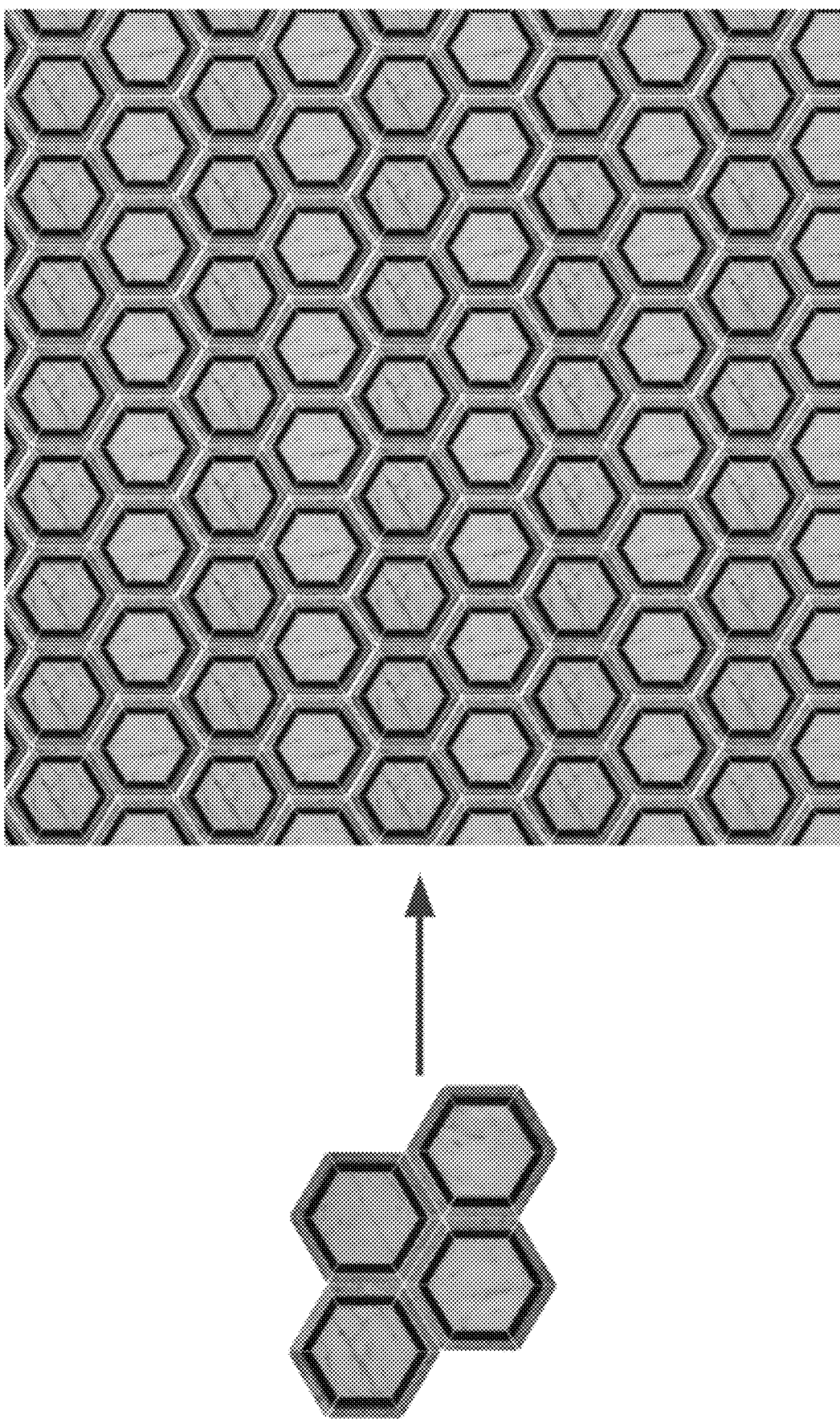
FIG. 18 illustrates an example of creating a tile template from a tile sheet of tiles in accordance with some embodiments.

After determining an amount of overlap between tile/tile sheet images in the tile template, process 1500 proceeds to act 1540, where the tile template is created using the individual tile/tile sheet images and the determined overlap. The process then proceeds to act 1550, where the tile template is stored for future use. The inventors have recognized that pre-determining tile templates (e.g., prior to a user indicating that they want to view the tile template as a wall covering) reduces an amount of time needed to render a desired wall tile on a wall surface of an image. FIG. 18 shows an example of a tile sheet of hexagonal tiles that has been used to create a tile template in accordance with the techniques described herein.

Figure 19:
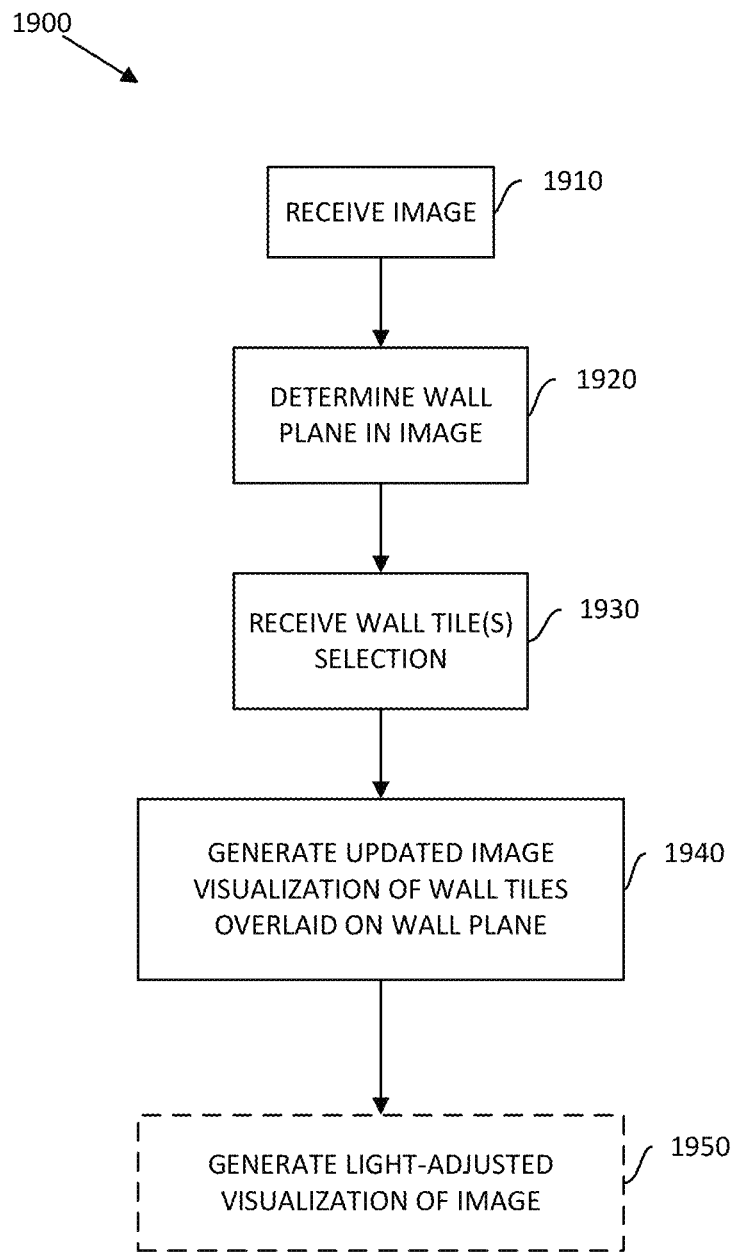
FIG. 19 illustrates a process for generating a visualization of wall surface coverings on a wall plane of a scene of an image in accordance with some embodiments.

FIG. 19 illustrates a process 1900 for visualizing wall coverings (e.g., wall tile, wallpaper) in a scene in accordance with some embodiments. In act 1910, an image of a scene is received (e.g., from image capture device 112). Process 1900 then proceeds to act 1920, where a wall plane in the received image is determined. The wall plane in the image may be determined in any suitable way. For instance, in some embodiments image capture device 112 may be configured to capture a time series of images (e.g., a camera feed or video) of a user's environment. As the image capture device is moved around by a user, visualization application 114 (or some other application executing on computing device 110) may process the images to identify one or more wall planes in the user's environment as the images are being captured. For instance, an identified wall plane in the captured images may be shown in an overlay, which may help guide the user to orient the image capture device 112 to orient the image capture device in a manner that captures an image of the scene at a suitable angle to perform further processing on the image, as discussed in more detail below. After the image capture device 112 is oriented at a suitable angle, an image, which may be used for further processing, is selected. The captured image may be automatically selected by the image capture device 112 and/or visualization application 114 or may be selected in response to a user interacting with the computing device 110 (e.g., by interacting with a user interface of the computing device to capture an image of the scene). In some embodiments, one or more wall planes in the image of the scene may be pre-selected (e.g., not determined at run-time), such that the user is only able to view wall surface coverings on one of the pre-selected wall planes.

Process 1900 then proceeds to act 1930, where a wall tile selection for overlay on the determined wall surface of the image of the scene is received. For instance, as discussed in more detail below, some embodiments for visualizing wall surface coverings relate to a web viewer that enables a user to select from among different tiles to display on a wall surface of an image of a scene. Process 1900 then proceeds to act 1940, where an updated image visualization of wall tiles overlaid on the wall plane is generated by overlaying wall tiles (e.g., from a tile template) on the previously identified wall plane. For instance, the updated image may be similar to the image captured by the user, but with some or all pixels on the identified wall plane replaced with a wall tile pattern corresponding to wall tile(s) selected by a user of computing device 110 in act 1930.

In an effort to make the updated image of the scene with tiles look more natural, some embodiments add lighting information such as shadows or highlights on the walls of the scene to the tiles. Accordingly, in some embodiments, process 1900 proceeds to act 1950 in which a light-adjusted visualization of the scene is generated. In some embodiments, shadows and lighting information is extracted from a scene and is used to create a shadow mask. The shadow mask may be converted to grayscale (e.g., pixel values having values in 0-255 range) and then may be composited with the rendered updated image of the scene in a shader, examples of which are described above in connection with generating flooring visualizations.

Figure 20:
FIG. 20 illustrates a user interface for a viewer configured to enable a user to visualize different wall tiles on wall surfaces of a selected image of a scene in accordance with some embodiments.

FIG. 20 illustrates a viewer (e.g., a web viewer) for visualizing surface coverings (e.g., wall tiles) in images of scenes in accordance with some embodiments. As shown, the viewer includes a plurality of selectors that enable a user to select different images and/or tiles to display in visualization window 2000. For instance, the viewer includes scene selector 2010 that enables a user to select an image of a scene to display in visualization window 2000 from among a plurality of stored scenes. The viewer also includes upload selector 2020, which enables a user to upload an image of a scene (e.g., an image of a scene captured using image capture device 112). Once uploaded, the image of the scene may be made available in scene selector 2010 for selection by the user. The viewer also includes tile selector 2030 that enables a user to select an individual tile or tile sheet to view on a wall surface of a selected image of a scene. For instance, as shown in FIG. 20, the user has selected an image of a tile sheet with hexagonal tiles to display on a wall surface of a selected bathroom scene. By providing a tile selector, the user can easily switch between different tile selections to visualize a wide range of tiles on a desired wall surface.

Figure 21C:
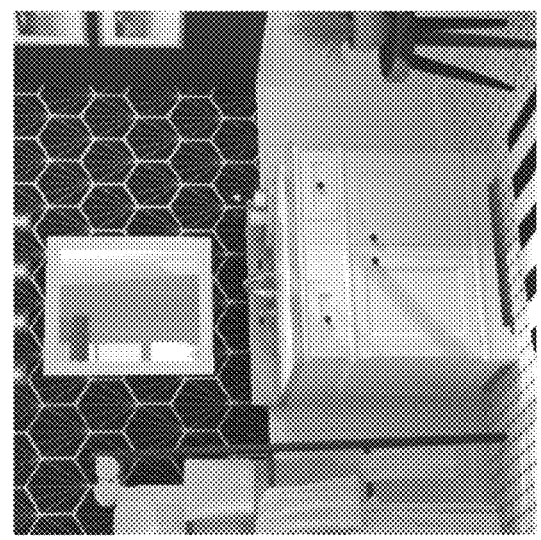
FIG. 21C illustrates a composited image in which a selected wall tile pattern is visualized on the wall plan identified in FIG. 21B.
Figure 21B:
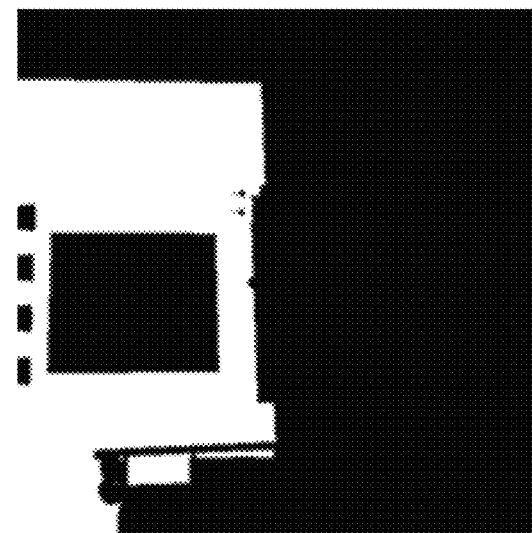
FIG. 21B illustrates a wall segmentation mask for the image of the scene shown in FIG. 21A in which the wall plane has been identified.
Figure 21A:
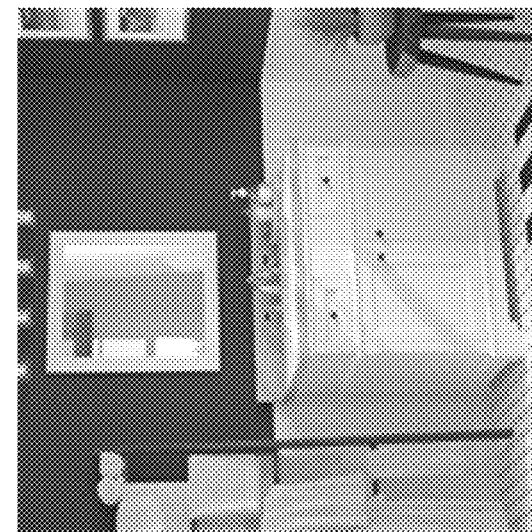
FIG. 21A illustrates an image of a scene in which one or more wall planes have been identified in accordance with some embodiments.

FIGS. 21A-21C illustrate a process for generating an updated image of a scene in visualization window 2000 of the viewer in accordance with some embodiments. FIG. 21A illustrates a selected image of a scene in which one or more wall planes or surfaces are determined. In some embodiments, a wall plane to overlay wall tiles is pre-selected (e.g., not user selectable) to avoid having to render each scene with each different tile when selected. FIG. 21B illustrates a wall segmentation mask for the image of the scene shown in FIG. 21A in which the wall plane (shown in white) has been identified. FIG. 21B illustrates a composited image in which the wall segmentation mask and a tile selection has been used to generate an updated image of a scene in which the selected tile is provided in a visualization shown on the image.

Figure 22:
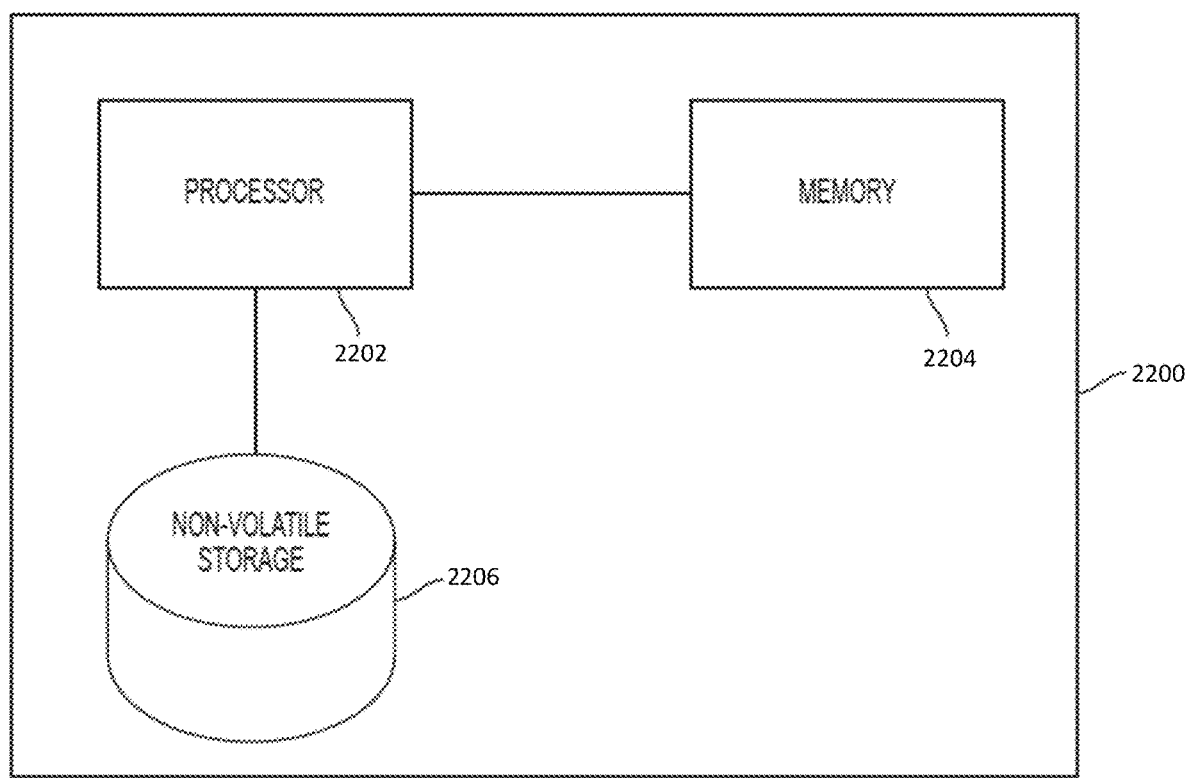
FIG. 22 schematically illustrates an example of a computing device on which some embodiments may be implemented.

An illustrative implementation of a computing device 2200 that may be used in connection with any of the embodiments of the disclosure provided herein is shown in FIG. 22. The computing device 2200 may include one or more computer hardware processors 2202 and one or more articles of manufacture that comprise non-transitory computer-readable storage media (e.g., memory 2204 and one or more non-volatile storage devices 2206). The processor 2202(*s*) may control writing data to and reading data from the memory 2204 and the non-volatile storage device(s) 2206 in any suitable manner. To perform any of the functionality described herein, the processor(s) 2202 may execute one or more processor-executable instructions stored in one or more non-transitory computer-readable storage media (e.g., the memory 2204), which may serve as non-transitory computer-readable storage media storing processor-executable instructions for execution by the processor(s) 2202.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of visualizing a wall covering on an image of a scene, the method comprising:
   receiving a selection of an image of a scene;
   determining a wall plane in the image;
   receiving a selection of one or more images of wall tiles to visualize in the image; and
   generating an updated image of the scene by overlaying on the determined wall plane, a visualization of the wall covering based, at least in part, on the selected one or more images of wall tiles,
   wherein generating the updated image of the scene comprises generating, based on the selection of one or more images of wall tiles, a tile template and overlaying the tile template on the determined wall plane,
   wherein generating the tile template comprises:
   determining a shape category of one or more tiles in the selected one or more images of wall tiles,
   determining, based on the determined shape category, an overlap between tiles in the tile template, and
   generating the tile template based on the determined shape category and the determined overlap.

2. The method of claim 1, further comprising:
   providing, on a viewer displayed in a user interface, a scene selector including indicators for a plurality of images of scenes, and wherein receiving the selection of the image of the scene comprises receiving a selection of one of the plurality of images of scenes included in the scene selector.

3. The method of claim 2, wherein the selected image of the scene is associated with a pre-selected wall plane, and wherein determining a wall plane in the image comprises determining the wall plane as the pre-selected wall plane.

4. The method of claim 1, wherein determining the shape category comprises determining whether a shape of the one or more tiles in the selected one or more images of wall tiles is a rectangle shape, a square shape or a hexagonal shape.

5. The method of claim 1, wherein determining the shape category comprises:
   determining that a shape of the one or more tiles is a non-standard shape;
   calculating, for each of the one or more tiles, a maximum number of background pixels in a row and column direction of the tile template to determine an offset; and
   determining, based, at least in part, on the offset, the overlap between tiles in the tile template.

6. The method of claim 1, wherein generating the tile template based, at least in part, on the determined overlap comprises using an alpha blending technique to generate the tile template.

7. The method of claim 1, further comprising:
   storing the generated tile template on one or more non-transitory storage devices.

8. The method of claim 1, wherein determining the wall plane comprises:
   extracting feature points from the scene in the image; and
   identifying the wall plane based on the extracted feature points.

9. The method of claim 1, further comprising:
   capturing a plurality of images from a camera feed of a smartphone, wherein the plurality of images includes the image of the scene; and
   displaying a visualization of the determined wall plane on a display of the smartphone during capture of the plurality of images.

10. The method of claim 9, further comprising:
    generating, by an augmented reality application, the visualization as a virtual overlay of a wall plane on an image of a physical scene.

11. A method of visualizing a wall covering on an image of a scene, the method comprising:
    receiving a selection of an image of a scene;
    determining a wall plane in the image;
    receiving a selection of one or more images of wall tiles to visualize in the image; and
    generating an updated image of the scene by overlaying on the determined wall plane, a visualization of the wall covering based, at least in part, on the selected one or more images of wall tiles,
    wherein generating the updated image comprises:
    applying a shader to the wall plane to determine segments of the wall plane that include pixels corresponding to wall, and rendering the visualization of the wall covering only on the segments of the wall plane determined to be wall.

12. A method of visualizing a wall covering on an image of a scene, the method comprising:
receiving a selection of an image of a scene;
determining a wall plane in the image;
receiving a selection of one or more images of wall tiles to visualize in the image; and
generating an updated image of the scene by overlaying on the determined wall plane, a visualization of the wall covering based, at least in part, on the selected one or more images of wall tiles,
wherein generating the updated image comprises generating the updated image to include lighting information, and
wherein generating the updated image to include lighting information comprises:
determining a luminance of each of the pixels in the image of the scene to generate a light map of the wall plane in the scene;
adjusting values of pixels in the visualization of the wall covering based, at least in part, on the generated light map to generate a light-adjusted visualization of the wall covering; and
overlaying the light-adjusted visualization on the pixels along the wall plane determined to correspond to wall in the scene.

13. A computing device configured to generate a visualization of a wall covering on an image of a scene, the computing device comprising:
at least one computer processor; and
at least one non-transitory computer-readable medium having a plurality of instructions stored thereon that, when executed by the at least one computer processor, perform a method comprising:
receiving a selection of an image of a scene;
determining a wall plane in the image;
receiving a selection of one or more images of wall tiles to visualize in the image; and
generating an updated image of the scene by overlaying on the determined wall plane, a visualization of the wall covering based, at least in part, on the selected one or more images of wall tiles,
wherein generating the updated image comprises:
applying a shader to the wall plane to determine segments of the wall plane that include pixels corresponding to wall, and
rendering the visualization of the wall covering only on the determined segments of the wall plane.

14. The computing device of claim 13, further comprising:
an image capture device configured to capture the image of the scene, wherein receiving the image of the scene comprises receiving the image of the scene from the image capture device.

15. The computing device claim 13, wherein the computing device is a smartphone.

16. A non-transitory computer readable medium having a plurality of computer-executable instructions stored thereon that, when executed by at least one computer processor perform a method of generating a visualization of a wall covering on an image of a scene, the method comprising:
receiving a selection of an image of a scene;
determining a wall plane in the image;
receiving a selection of one or more images of wall tiles to visualize in the image; and
generating an updated image of the scene by overlaying on the determined wall plane, a visualization of the wall covering based, at least in part, on the selected one or more images of wall tiles,
wherein generating the updated image comprises:
applying a shader to the wall plane to determine segments of the wall plane that include pixels corresponding to wall, and
rendering the visualization of the wall covering only on the determined segments of the wall plane.

* * * * *